United States Patent [19]

Kuriyama

[11] Patent Number: 4,988,187
[45] Date of Patent: Jan. 29, 1991

[54] IMAGE PROJECTOR APPARATUS HAVING AUTOMATIC FOCUS CONTROL SYSTEM

[75] Inventor: Masaaki Kuriyama, Osaka, Japan
[73] Assignee: Minolta Camera Kabushiki Kaisha, Osaka, Japan
[21] Appl. No.: 211,449
[22] Filed: Jun. 24, 1988
[30] Foreign Application Priority Data
Jun. 26, 1987 [JP] Japan ................................ 62-160435
[51] Int. Cl.$^5$ .............................................. G03B 3/00
[52] U.S. Cl. .................... 353/101; 353/26 A; 355/55
[58] Field of Search .................. 353/101, 26 A, 27 A, 353/76, 82; 355/55, 56; 352/140; 354/402, 405; 250/201, 204

[56] References Cited

U.S. PATENT DOCUMENTS

| | | | |
|---|---|---|---|
| 3,191,491 | 6/1965 | Pignone et al. | 353/101 |
| 3,450,883 | 6/1969 | Thomas | 250/204 |
| 3,622,797 | 11/1971 | Bragg | 250/234 |
| 3,856,392 | 12/1974 | Harrison | 353/101 |
| 3,967,108 | 6/1976 | Hollis | 353/101 |
| 4,281,927 | 8/1981 | Dzuban | 355/56 |
| 4,410,258 | 10/1988 | Aoki et al. | 354/25 |
| 4,660,955 | 4/1987 | Ishida et al. | 354/408 |
| 4,696,558 | 9/1987 | Karasaki et al. | 354/406 |
| 4,723,139 | 2/1988 | Ogasawara | 354/402 |
| 4,825,243 | 4/1989 | Ito et al. | 353/26 A |

FOREIGN PATENT DOCUMENTS

| | | |
|---|---|---|
| 51-14324 | 2/1976 | Japan . |
| 59-34505 | 2/1984 | Japan . |
| 60-227241 | 11/1985 | Japan . |
| 61-39012 | 2/1986 | Japan . |
| 61-247157 | 11/1986 | Japan . |
| 62-105571 | 5/1987 | Japan . |
| 62-108665 | 5/1987 | Japan . |
| 62-164031 | 7/1987 | Japan . |

Primary Examiner—William A. Cuchlinski, Jr.
Assistant Examiner—Patrick R. Scanlon
Attorney, Agent, or Firm—Burns, Doane, Swecker & Mathis

[57] ABSTRACT

An optical apparatus wherein an image is to be focused onto a generally rectangular projection surface through a projection lens and wherein a focal state at a particular location of the projection surface is to be detected to move the projection lens on the basis of the result of detection of the focal state, a method of automatically controlling the focal point of the projection lens, characterized in that, when it is found that the focal state of the particular location of the projection surface can not be detected, a focal state at another location of the projection surface is detected to move the projection lens with respect to the projection surface on the basis of the result of the detection at the other location.

12 Claims, 26 Drawing Sheets

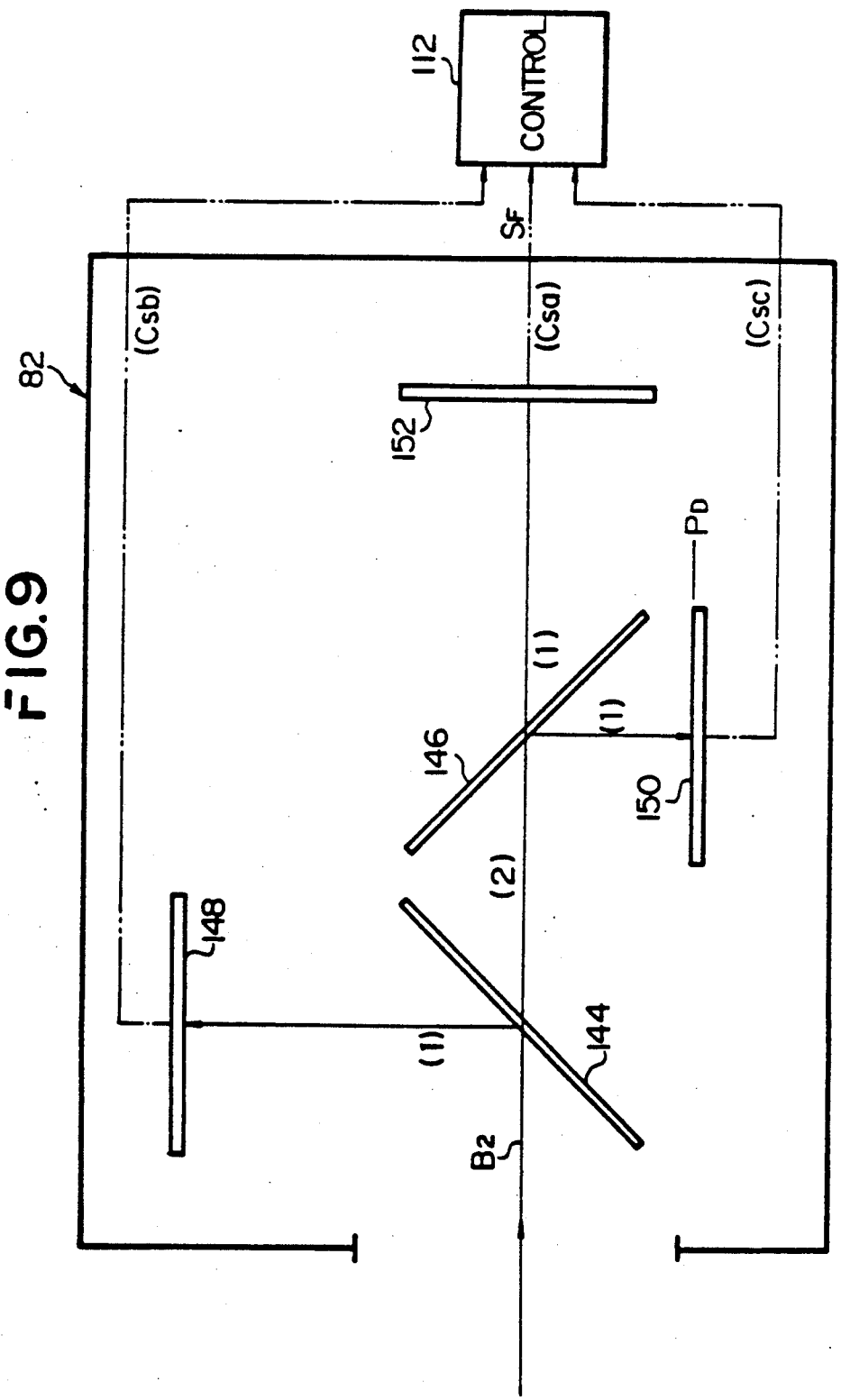

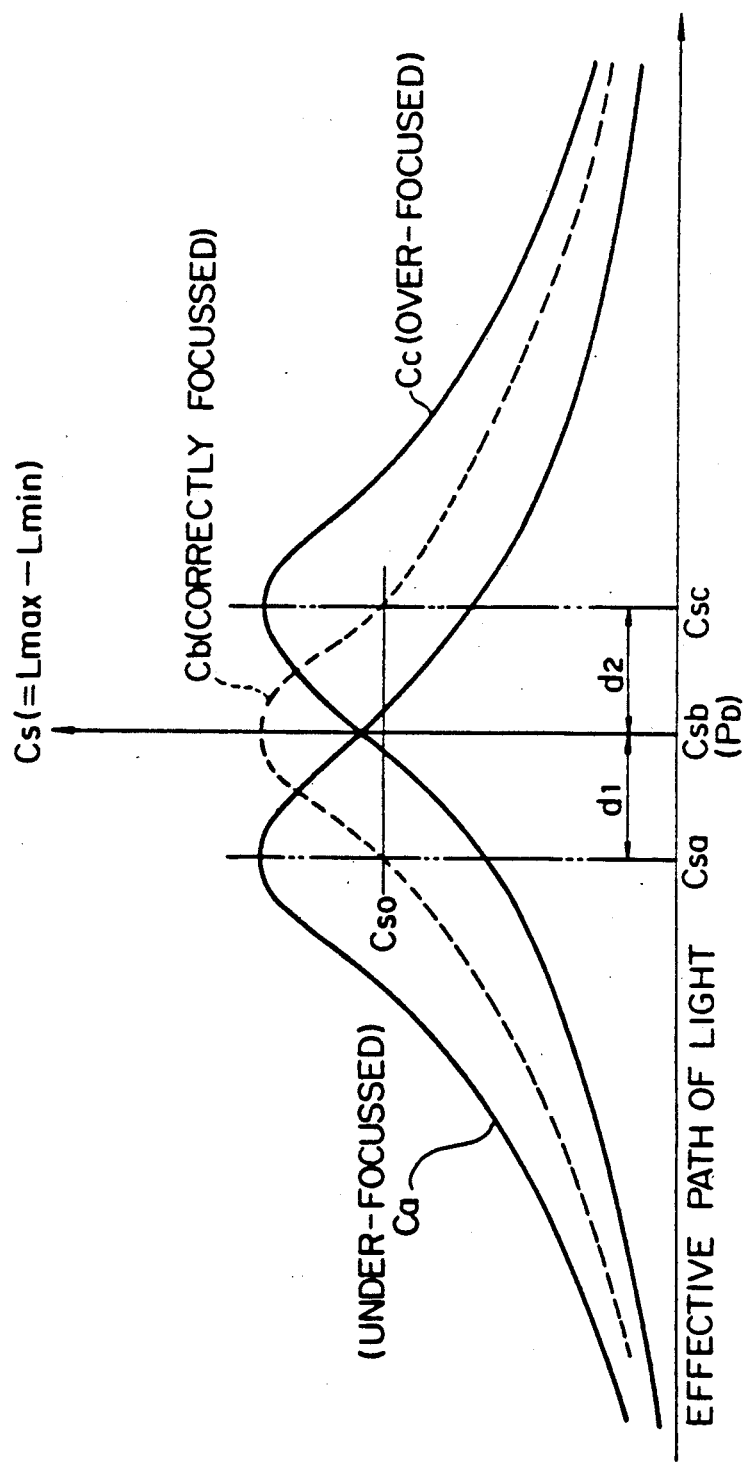

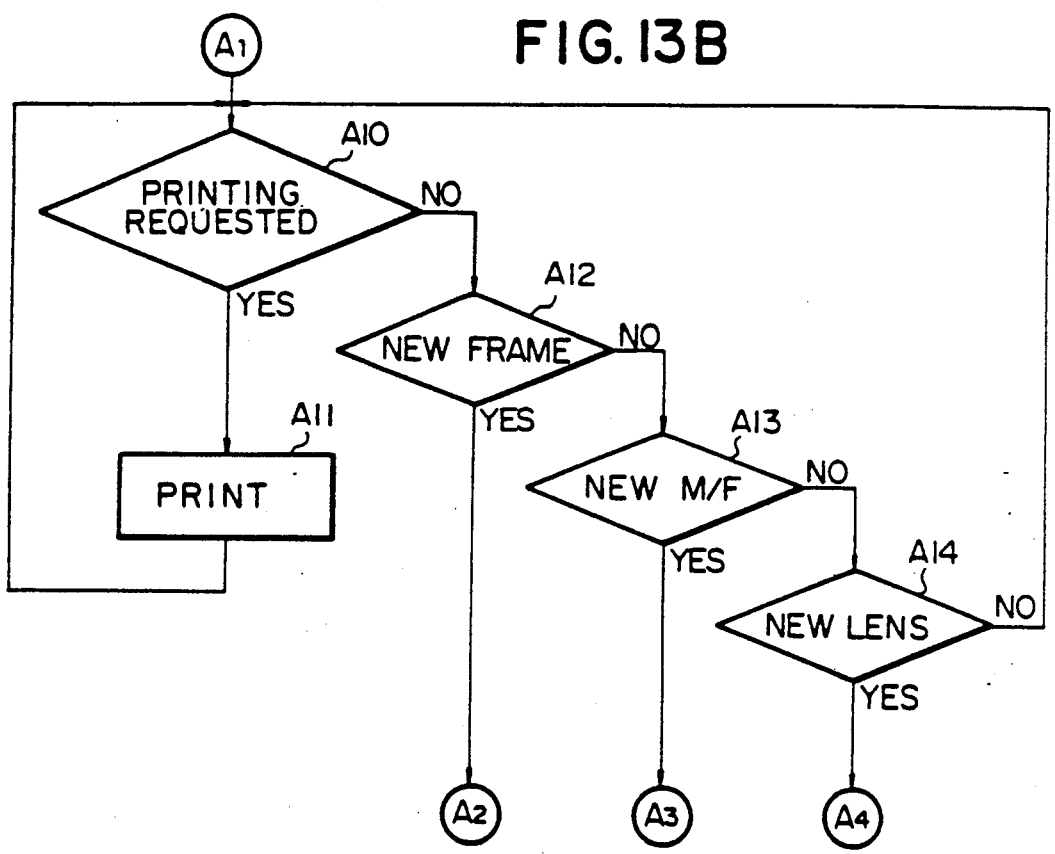
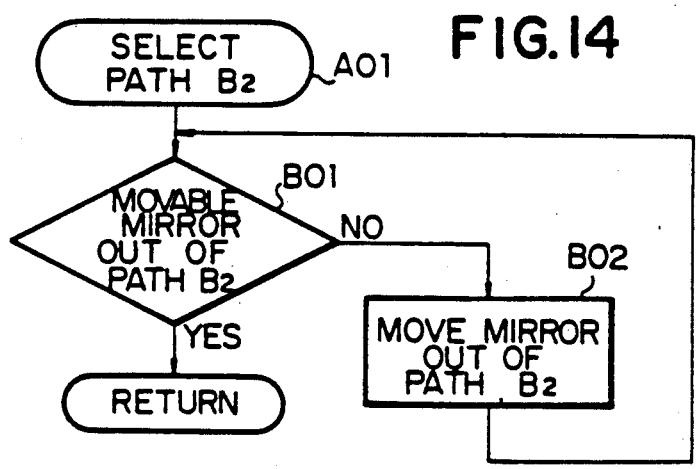

140A

140B

140C

140D

140E

140F

IMAGE PROJECTOR APPARATUS HAVING AUTOMATIC FOCUS CONTROL SYSTEM

FIELD OF THE INVENTION

The present invention relates to an image projector apparatus such as a microfilm strip reader or a microfilm strip reader/printer apparatus having an automatic focus control system.

BACKGROUND OF THE INVENTION

In an image projector apparatus such as a microfilm strip reader, printer or combination reader/printer apparatus, the image to be reproduced on the viewing screen is correctly focussed with the projection lens moved with respect to the viewing screen through manipulative efforts of the operator, or viewer, who drives the lens directly or handles the mechanical lens position control means provided in the apparatus.

A problem is encountered in such an image projector apparatus in that the focal point of the projection lens may be disturbed when the microfilm strip (or microfiche) which has been in use in the apparatus or the microfilm holder assembly which has been installed in the apparatus is exchanged with a new one. In order to have a beam of light from the projection lens correctly focussed onto the viewing screen during the reading operation or onto the photosensitive drum during the printing operation, an image projector apparatus is provided with a focus control system. A focus control system for use in a known image projector apparatus having such an automatic focus control system has a focus detect area located externally of the viewing screen so that the path of light from the projection lens to the focus detect area is equal in length to the path of light from the projection lens to the viewing screen. The focal point of the projection lens is thus detected from a beam of light incident on this focus detect area located outside the viewing screen. An example of a focus control system of this nature is disclosed in Japanese Provisional Patent Publication (Kokai) No. 60-227241. A focus control system therein disclosed is however not fully acceptable because it is preferable that the focus detect area located externally of the viewing screen be located in the vicinity of the optical axis of the projection lens, that is, centrally of the viewing screen in consideration of the performance characteristics of the lens.

A focus control system is, basically, operative to detect whether or not a beam of light is correctly focussed onto a projection surface which is in this instance implemented by the viewing screen of an image projector apparatus. Such detection is made upon analysis of the distribution of the intensities of light forming an image focussed onto the projection surface. This means that the focal point at which the beam of light may be focussed onto the projection surface can be detected from a beam of light carrying information including image patterns with any degrees of contrast.

A wide variety of image information is recorded on microfilms and may include such information as to produce no visual image in a central area of the viewing screen. If a focus control system is designed to have a focus detect area in the vicinity of a central area of the viewing screen, the system could not detect the focal point from the beam of light to be incident on the central area of the viewing screen since the beam of light produces no visual image in that particular area of the screen.

In order to solve this problem, the focus detect area of the system may be moved either horizontally or vertically from the central area of the viewing screen. Such location of the focus detect area is however not acceptable for the detection of the focal point of a beam of light carrying two image zones which are spaced apart from each other across a blank area extending either horizontally or vertically of the overall image area which is to result from the beam of light.

The present invention contemplates elimination of such a problem and, accordingly, aims at providing an image projector apparatus having an automatic focus control system which is capable of correctly detecting the focal point of a beam of light passed through a projection lens even if the beam of light may carry image zones spaced apart from each other across a blank area extending horizontally or vertically of the overall image area to result from the beam of light.

SUMMARY OF THE INVENTION

In accordance with the present invention, there is provided in an optical apparatus wherein an image is to be focused onto a generally rectangular projection surface through a projection lens and wherein a focal state at a particular location of the projection surface is to be detected to move the projection lens on the basis of the result of detection of the focal state, a method of automatically controlling the focal point of the projection lens, characterized in that, when it is found that the focal state at the particular location of the projection surface can not be detected, a focal state at another location of the projection surface is detected to move the projection lens with respect to the projection surface on the basis of the result of the detection at the other location. The particular location may be selected within an area extending from one end of the projection surface to another preferably within an area extending from one of the parallel ends of the rectangular projection surface to the other or within an area extending from one of the diagonally opposite corners of the rectangular projection surface to the other.

In accordance with another outstanding aspect of the present invention, there is provided an automatic focus control system for an optical apparatus wherein an image is to be focused onto a generally rectangular projection surface through a projection lens and wherein the projection lens is to be moved with respect to the projection surface on the basis of signals output from focus detect means located externally of the projection surface, the automatic focus control system comprising beam deflecting means located in a path of light from the projection lens to the projection surface for projecting onto the focus detect means an image corresponding to an image to be projected onto a particular region of the projection surface, the particular region being selected within an area extending from one of the diagonally opposite corners of the rectangular projection surface to the other, and control means for controlling the beam deflecting means so that, when it is found that the signals fail to satisfy a predetermined condition, the beam deflecting means projects onto the focus detect means an image corresponding to an image to be projected onto a second region of the projection surface. In an automatic focus control system thus constructed and arranged in accordance with the present invention, the second region is preferably also selected within the area extending from one of the diagonally opposite corners of the rectangular projection surface to the other.

In accordance with still another outstanding aspect of the present invention, there is provided in an optical apparatus including a detachable projection lens and automatic focus control means, the combination of detecting means for detecting incorporation of the projection lens into the apparatus, and means for enabling the automatic focus control means to operate when the incorporation of the projection lens into the apparatus is detected by the detecting means. Where the optical apparatus further includes a movable member to be moved within the apparatus when the projection lens is to be incorporated into or detached from the apparatus, the detecting means may be responsive to movement of the movable member for detecting incorporation of the projection lens into the apparatus when the movable member is caused to move within the apparatus.

BRIEF DESCRIPTION OF THE DRAWINGS

The features and advantages of a magnified image projector apparatus according to the present invention will be more clearly appreciated from the following description taken in conjunction with the accompanying drawings in which:

FIG. 9 is a schematic view showing the general construction of the photodetector unit incorporated in the microfiche read-printer apparatus illustrated in FIGS. 1 and 2;

FIG. 11 is a graphic representation of the image contrast determined at various locations with respect to such a plane when the beam of light is under-focussed, correctly focussed and over-focussed;

FIGS. 13A and 13B are flowcharts showing an example of the main routine program which may be executed in the image projector apparatus embodying the present invention;

FIG. 14 is a flowchart showing the details of a second-path-of-light select subroutine program included in the main routine program illustrated in FIGS. 13A and 13B;

DESCRIPTION OF THE PREFERRED EMBODIMENT

Figure 1:
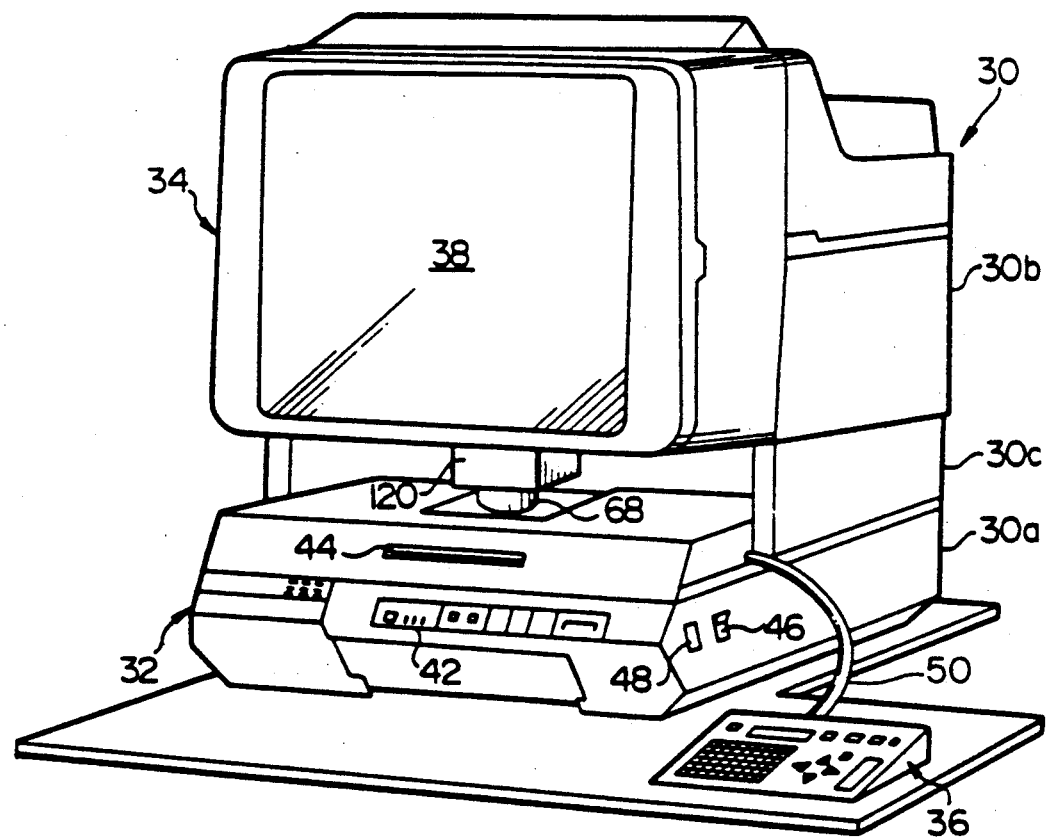
FIG. 1 is a perspective view showing the external construction of an image projector apparatus embodying the present invention.

FIG. 1 shows the external appearance of a microfilm reader apparatus which implements an image projector apparatus embodying the present invention and which is assumed to form part of a microfilm reader-printer system of the type using a microfiche. The microfilm reader-printer apparatus, which per se is well known in the art, has a housing structure 30 and is largely composed of a lower mechanical and optical module 32, an upper display module 34 positioned over the mechanical and optical module 32, and a control module implemented by a keyboard unit 36. The housing structure 30 has a lower portion 30a forming part of the mechanical and optical module 32, an upper portion 30b forming part of the display module 34, and an intermediate portion 30c vertically intervening between the modules 32 and 34 as shown. The reader-printer apparatus further includes a printer module, which is however not herein shown since the present invention is not directly concerned with the capabilities of such an additional module.

The upper display module 34 comprises a front viewing screen 38 and, as will be described in more detail, reflector mirrors incorporated within the upper portion 30b of the housing structure 30. The lower mechanical and optical module 32 comprises a control panel 42 provided on a front wall of the lower portion 30a of the housing structure 30 and a microfiche feed slot 44 formed in the front wall portion. On the control panel 42 are disposed various switches including a print start switch, a microfiche format select switch and a positive/negative shift switch. The microfiche feed slot 44 is provided to allow manual insertion of a microfiche into the module 32. The mechanical and optical module 32 further comprises a power supply switch 46 and an image twist control switch 48 which may be used by a viewer to cause an image on the viewing screen 38 to turn through a desired angle. The keyboard unit 36 is electrically connected to the mechanical and optical module 32 by means of a wire cable 50.

Figure 2:
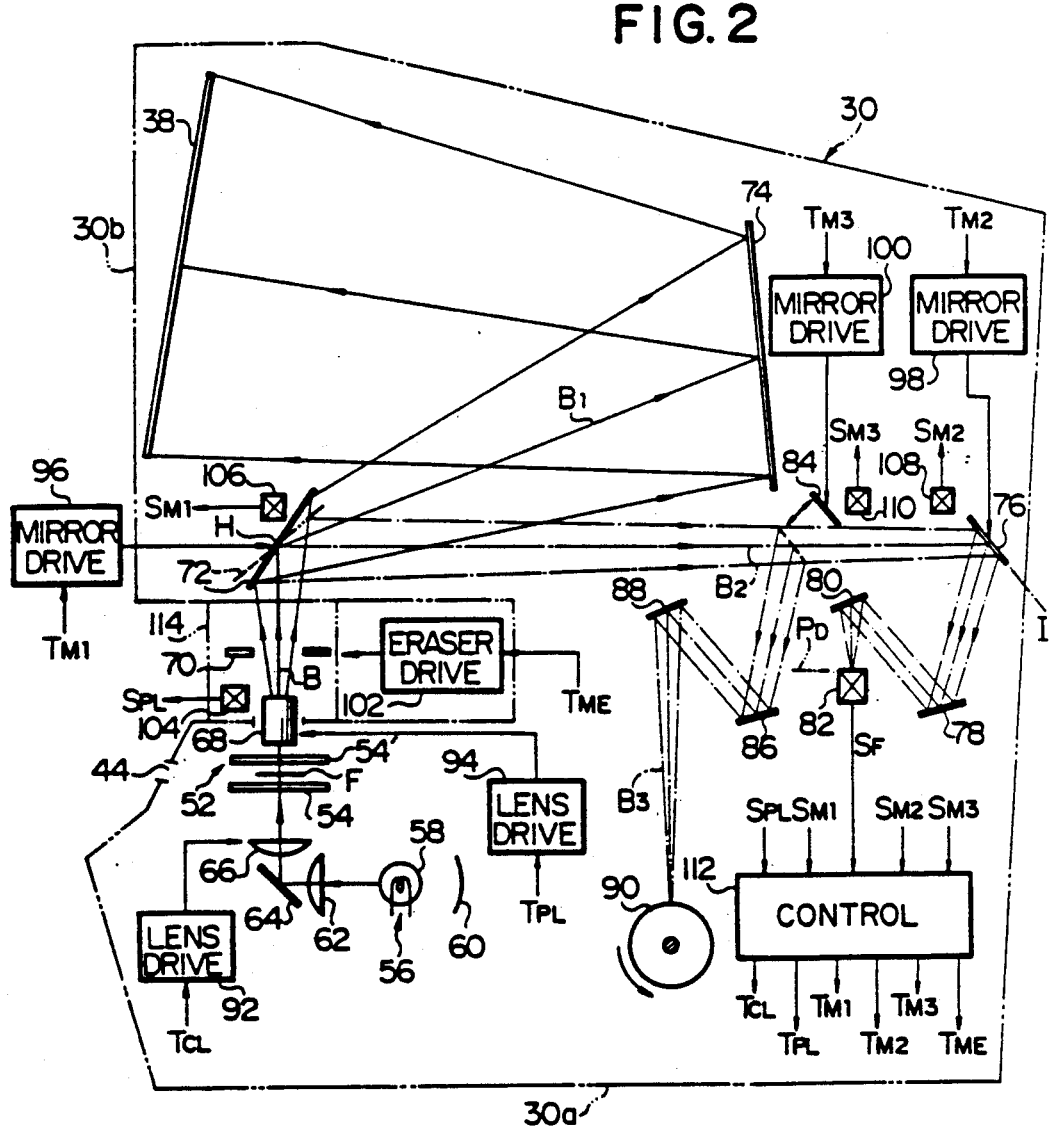
FIG. 2 is a schematic view showing part of the general mechanical, optical and control systems of the image projector apparatus illustrated in FIG. 1, the optical arrangement being illustrated in side elevation.

FIG. 2 shows the internal arrangement of the modules 32 and 34 of the microfilm reader apparatus shown in FIG. 1. Within the lower portion 30a of the housing structure 30 is provided a microfiche holder assembly 52 including a pair of transparent microfiche holder plates 54 and 54' which are spaced apart in parallel from each other. A microfiche F manually fed into the module 32 through the microfiche feed slot 44 and carrying a single image or a plurality of image frames is held in place between these microfiche holder plates 54 and 54'. The microfiche holder assembly 52 is horizontally movable forwardly or rearwardly, or leftwardly or rightwardly so that any desired one of the image frames on a microfiche F carried thereon can be brought into alignment with the beam of light passing through the assembly 52.

On one side of the microfiche holder assembly thus including the holder plates 54 and 54' is provided a light source assembly 56 which comprises an illumination lamp 58 and a concave reflector mirror 60 located in conjunction with the lamp 58. The illumination lamp 58 is energized with a voltage $V_{LAMP}$ which is controlled to be optimum under various print/read conditions. The light emitted from the illumination lamp 58 is collimated by the concave reflector mirror 60 having an optical axis perpendicular to the direction in which the beam of light is to be transmitted through the microfiche F. The collimated beam of light thus reflected from the reflector mirror 60 is passed through a first condenser lens 62 and is re-directed at an angle of 96 degrees by a plane reflector mirror 64. Past the plane reflector mirror 64 is positioned a second condenser lens 66 through which the beam of light reflected from the mirror 62 is directed toward the microfiche F between the holder plates 54 and 54'.

The beam of light transmitted through the microfiche F and now carrying image information read from any image frame recorded on the microfiche F is passed through a cylindrical projection lens 68 and an opening in a marginal mask member 70 to a rockable reflector mirror 72 located within the display module 34. As will be described in detail, the cylindrical projection lens 68 is axially movable with respect to the microfiche holder assembly 52 so that the location of the effective focal point of the lens 68 is adjustable. From the reflector mirror 72, the information carrying beam of light is re-directed to an image projecting reflector mirror 74 and is projected onto the viewing screen 38 positioned at the front end of the upper portion 30b of the housing structure 34. The projection lens 68 has a focal distance which is selected so that the location or point at which the beam of light directed toward the viewing screen 38 is to be focussed is on the inner or rear face of the screen 38. On the viewing screen 38 is thus reproduced a magnified image of any of the image frames recorded on the microfiche F.

The rockable reflector mirror 72 is pivotally movable about a horizontal axis H fixed with respect to and parallel with the plane of the viewing screen 38 so that the beam of light B received from the projection lens 68 is directed either to the image projecting reflector mirror 74 or past reflector mirrors 76, 78 and 80 to a photodetector unit 82. Thus, the rockable reflector mirror 72 may have a first angular position directing the beam of light B from the projection lens 68 to the image projecting reflector mirror 74 along a first path of light $B_1$ as indicated by full lines and a second angular position directing the beam B to the photodetector unit 82 along a second path of light $B_2$ as indicated by dot-and-dash lines. This photodetector unit 82 has a light receiving plane $P_D$ on which the beam of light travelling from the rockable reflector mirror 72 along the second path of light $B_2$ is to be incident when the beam is correctly focused by the projection lens 68 to produce a reduced image of an image frame on the microfiche F.

Where the apparatus embodying the present invention includes a printer module, there are additional reflector mirrors 84, 86 and 88 provided to have the beam of light directed toward a photosensitive drum 90 positioned within the lower portion 30a of the housing structure 30. Of these additional reflector mirrors 84, 86 and 88, the reflector mirror 84 in particular is arranged to be movable into and out of the second path of light $B_2$ from the rockable reflector mirror 72. When held in a position withdrawn from the second path of light $B_2$, the movable reflector mirror 84 allows the beam of light from the rockable reflector mirror 72 to reach the photodetector unit 82 past the associated reflector mirrors 76, 78 and 80 all the way along the second path of light $B_2$. When moved into a position (indicated by dotted line) in the second path of light $B_2$, the movable reflector mirror 84 intercepts the beam of light from the rockable reflector mirror 72 and re-directs the beam to travel toward the photosensitive drum 90 past the associated reflector mirrors 86 and 88 along a third path of light $B_3$ which is bent from the second path of light $B_2$. These reflector mirrors 84, 86 and 88 and the photosensitive drum 90 form part of the printer module of the reader-printer apparatus embodying the present invention.

As well known in the art, the printer module of the apparatus further comprises an electrostatic charger, a developing unit and a charge eraser, though not shown in the drawings. The charger applies electrostatic charges to the drum surface for producing latent images by irradiation of the charged surface with the information-carrying light incident thereon. The latent images are developed into visible images by application of toner particles from the developing unit and the resultant toner images are transferred to a print sheet supplied from a print sheet supply cassette assembled to the apparatus. The charge eraser removes the charges which may be left on the drum surface after the images are transferred to the print sheet.

One of the reflector mirrors 76, 78 and 80 provided in conjunction with the photodetector unit 82, typically the reflector mirror 76 as herein assumed, is rockable about an axis I fixed with respect to the housing structure 30. The axis I about which the reflector mirror 76 is thus rockable is perpendicular in non-intersecting relationship to the axis H about which the reflector mirror 72 is rockable with respect to the housing structure 30. When at least one of the two rockable reflector mirrors 72 and 76 is caused to turn about the axis of rotation thereof with the movable reflector mirror 84 held out of the second path of light $B_2$ from the rockable reflector mirror 72, an imaginary display area equivalent to the overall area of the viewing screen 38 and assumed to be produced at the light receiving plane of the photodetector unit 82 will be moved in any direction with respect to the light sensitive area of the photodetector unit 82. Thus, when both of the two rockable reflector mirrors 72 and 76 are caused to concurrently turn about the respective axes H and I of rotation thereof, the light sensitive area of the photodetector unit 82 will be in effect moved diagonally of such an imaginary display area equivalent to the overall area of the viewing screen 38. In the description to follow, the rockable reflector mirrors 72 and 76 will be referred to as first and second rockable reflector mirrors, respectively.

One of the condenser lenses 62 and 66 such as typically the second condenser lens 66 is arranged to be axially movable with respect to the microfiche holder assembly 52. The second condenser lens 66 is thus operatively connected to and driven for axial movement by a first lens drive unit 92. Similarly, the cylindrical projection lens 68 is axially movable with respect to the microfiche holder assembly 52 including the microfiche holder plates 54 and 54' and is operatively connected to and driven for axial movement by a second lens drive unit 94. The first rockable reflector mirror 72 is operatively connected to and driven for pivotal movement by a first mirror drive unit 96 and, likewise, the second rockable reflector mirror 76 is operatively connected to and driven for pivotal movement by a second mirror drive unit 98. Similarly, the movable reflector mirror 84 is operatively connected to and driven for reciprocal movement by a mirror drive unit 100. The marginal mask member 70 is movable in transversely intersecting directions normal to the path of light from the projection lens 68. The marginal mask member 70 is thus also operatively connected to and driven for movement by a drive unit 102. Each of the drive units 92, 94, 96, 98, 100 and 102 as above mentioned may largely comprise a reversible stepper motor and a suitable gear mechanism operatively connected between the motor and the mirror 72, 76 or 84, lens 66 or 68, or marginal mask member 70.

These drive units 92, 94, 96, 98, 100 and 102 are controlled to operate on the basis of signals including signals $S_F$ produced by the photodetector unit 82, a signal $S_{PL}$ produced by a lens position detector 104, signals $S_{M1}$ and $S_{M2}$ produced by mirror position detectors 106 and 108, respectively, and a signal $S_{M3}$ produced by a mirror position detector 110. The lens position detector 104 is located in conjunction with the projection lens 68 and is operative to produce the signal $S_{PL}$ responsive to the position of the lens 68 with respect to the microfiche holder assembly 52. The mirror position detectors 106 and 108 are located in conjunction with the first and second rockable reflector mirrors 72 and 76 and are operative to produce the signals $S_{M1}$ and $S_{M2}$ responsive to the angular positions of the reflector mirrors 72 and 76, respectively. The mirror position detector 110 is located in conjunction with the movable reflector mirror 84 and is operative to produce the signal $S_{M3}$ responsive to the position of the reflector mirrors 84 with respect to the second path of light $B_2$ from the first rockable reflector mirror 72.

The signal $S_{PL}$ produced by the lens position detector 104, the signals $S_{M1}$, $S_{M2}$ and $S_{M3}$ produced by the mirror position detectors 106, 108 and 110, respectively, as well as the signals $S_F$ produced by the photodetector unit 82 are supplied to a control circuit 112. On the basis of these signals $S_{PL}$, $S_{M1}$, $S_{M2}$ and $S_{M3}$ thus supplied from the detectors 104, 106, 108 and 110, respectively, and the signals $S_F$ supplied from the photodetector unit 82, the control circuit 112 produces control signals $T_{PL}$, $T_{M1}$, $T_{M2}$ and $T_{M3}$ to control the drive units 94, 96, 98 and 100, respectively. The control circuit 112 is further operative to produce control signals $T_{CL}$ and $T_{ME}$ to control the drive unit 92 for the condenser lens 66 and the drive unit 102 for the marginal mask member 70, respectively. These signals $T_{CL}$ and $T_{ME}$ may be produced on the basis of any of the control signals $T_{PL}$, $T_{M1}$, $T_{M2}$ and $T_{M3}$ or directly responsive to any of the signals $S_{PL}$, $S_{M1}$, $S_{M2}$ and $S_{M3}$. Such a control circuit 112 may be constructed of a microprocessor including a central processing unit, a read-only memory and a random-access memory as will be described in more detail.

Figure 3:
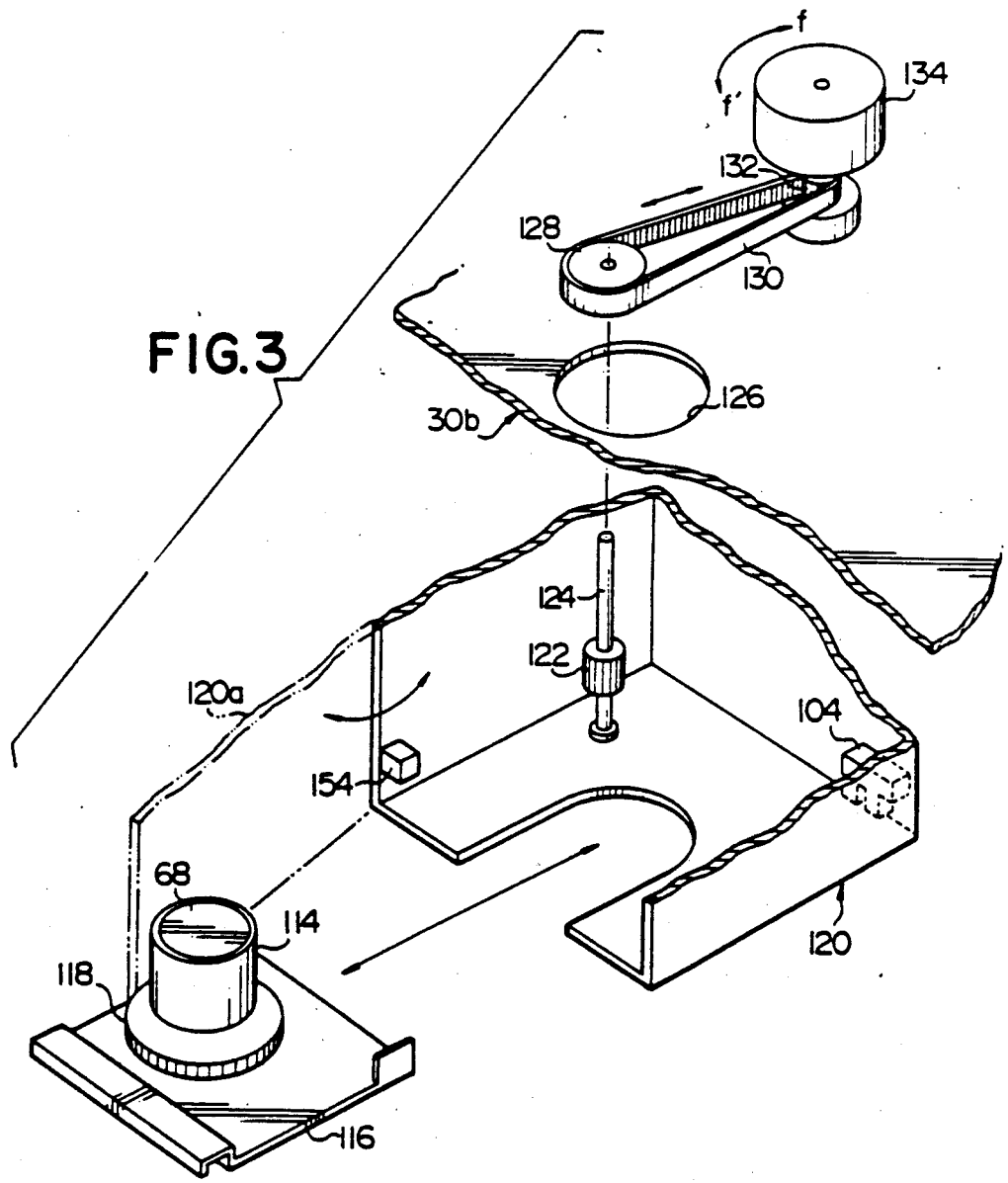
FIG. 3 is a fragmentary perspective view showing an example of the general mechanical arrangement of a drive unit for a projection lens provided in the apparatus of FIGS. 1 and 2.

The lens drive unit 94 is controlled to drive the projection lens 68 for axial movement with respect to the microfiche holder assembly 52 so that the beam of light emanating from the projection lens 68 is correctly focussed on the viewing screen 38 when directed along the first path of light $B_1$ or on the photodetector unit 82 or the photosensitive drum 90 when directed along the second or third path of light $B_2$ or $B_3$, respectively. In FIG. 3 is shown an example of the general mechanical arrangement of such a lens drive unit 94.

Referring to FIG. 3, the projection lens 68 is coaxially encased in a hollow cylindrical sleeve 114 having an externally threaded axial portion (not shown) and rotatably mounted on a lens support plate 116. The sleeve 114 has its externally threaded axial portion held in mesh with an internally threaded inner peripheral edge of an externally toothed annular spur gear 118 which is provided coaxially with the projection lens 68. The lens assembly thus composed of the lens 68, sleeve 114, lens support plate 116 and gear 118 is detachably fitted into a lens casing 120 which is secured to or forms part of the upper portion 30b of the housing structure 30 as seen also in FIG. 1. The lens casing 120 has a front door 120a hingedly connected to a side wall of the casing 120 and is to be opened up to provide access to the lens assembly thus installed within the casing 120 when it is desired to have the lens assembly with another one having a different projection lens. Within the casing 120, the gear 118 in mesh with the threaded sleeve 114 is further held in mesh with a pinion 122 carried on a shaft 124 which extends upwardly into the upper portion 30b of the housing structure 30 through an opening 126 provided in a bottom panel portion of the housing portion 30b. Within the upper housing portion 30b, the shaft 124 carrying the pinion 122 is coupled to a driven pulley 128 which cooperates through an endless belt 130 with a drive pulley 132 to be driven by a reversible stepper motor 134. The motor 134 has an output shaft connected to the drive pulley 16 directly or through a suitable reduction gear assembly, though not shown in the drawings. Within the lens casing 120 is further located the lens position detector 104 described with reference to FIG. 2.

When activated with the control signal $S_{PL}$ supplied from the control circuit 112 as previously discussed, the reversible motor 134 drives the drive pulley 132 for rotation in either of the directions of arrowheads f and f'. A driving force is thus transmitted from the motor 134 to the sleeve 114 by way of the drive pulley 132, endless belt 130, driven pulley 128, shaft 124, pinion 122 and gear 118 so that the sleeve 114 is driven to turn with respect to the lens support plate 116 about the center axis of the cylindrical projection lens 68. The turning movement of the sleeve 114 is translated into axial movement of the projection lens 68, which is accordingly caused to move axially with respect to the lens support plate 116 and accordingly with respect to the first rockable reflector mirror 72.

Figure 4:
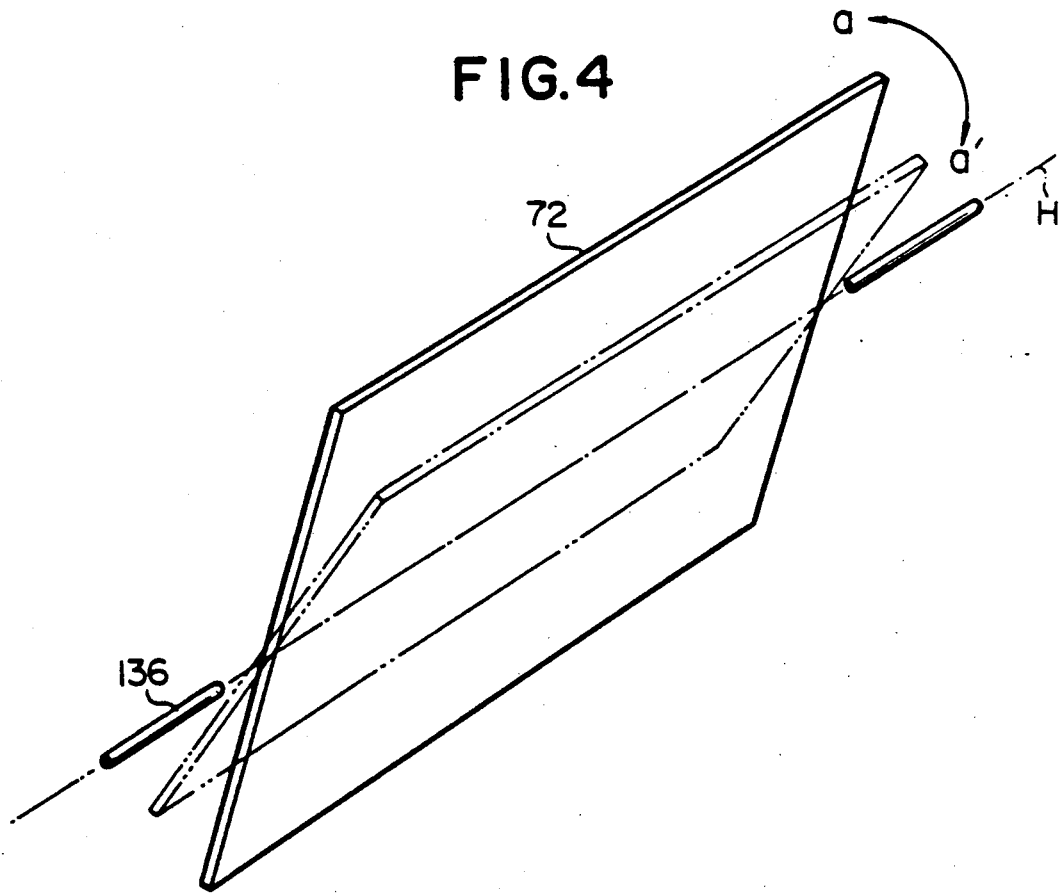
FIG. 4 is a perspective view showing the arrangement in which a first rockable reflector mirror forming part of the optical system of the apparatus shown in FIGS. 1 and 2 is rockable.

FIG. 4 is a perspective view showing the arrangement in which the rockable reflector mirror 72 forming part of the optical system provided in the apparatus shown in FIGS. 1 and 2 is rockable about the axis H parallel with the viewing screen 38.

Figure 5:
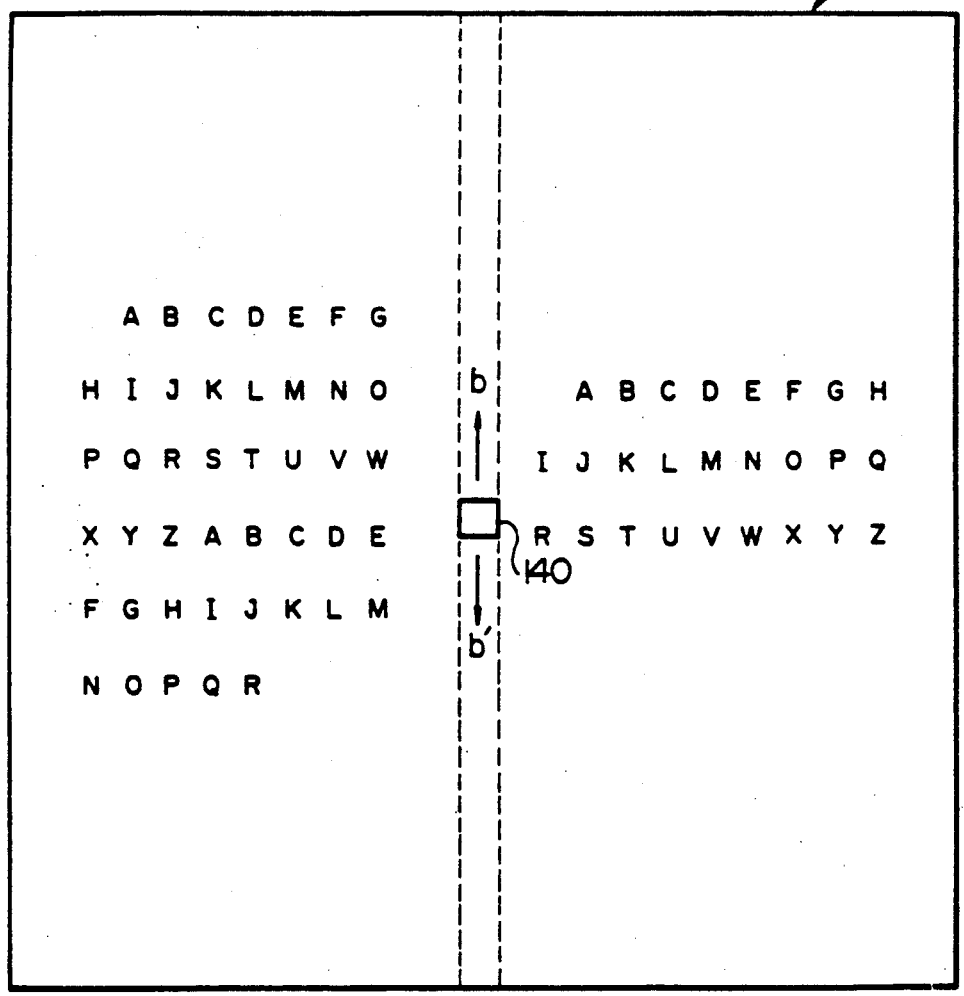
FIG. 5 is a plan view showing an example of an imaginary display area equivalent to the overall area of the viewing screen of the apparatus shown in FIGS. 1 and 2 and assumed to be produced at the light receiving plane of a photodetector unit incorporated in the apparatus shown with the first rockable reflector mirror turned in either direction.

As shown, the rockable reflector mirror 72 is supported on a pivot shaft 136 having a center axis coincident with the axis H of turn of the mirror 72 and is thus rockable about the axis H of the shaft 136 in either direction as indicated by arrowheads a and a'. Though not shown in the drawings, the pivot shaft 136 has opposite end portions journalled in a suitable manner in any structural member or members of the housing structure 30. FIG. 5 shows an example of the above mentioned imaginary display area, 138, equivalent to the overall area of the viewing screen 38 and assumed to be produced at the light receiving plane $P_D$ of the photodetector unit 82.

When the rockable reflector mirror 72 is driven to turn in the direction of arrowhead a or a' about the axis H thereof with the reflector mirror 84 held out of the second path of light $B_2$, the imaginary display area 138 equivalent to the overall area of the viewing screen 38 is moved vertically with respect to the light sensitive area 140 of the photodetector unit 82. In other words, the light sensitive area 140 of the photodetector unit 82 is moved relative to the imaginary display area 138 vertically in a direction of arrow b or in a direction of arrow b', respectively, as shown in FIG. 5 when the reflector mirror 72 is driven to turn in the direction of arrowhead a or a' as shown in FIG. 4. When the rockable reflector mirror 72 has a certain angular position about the axis H of turn thereof, the light sensitive area 140 of the photodetector unit 82 will be located centrally of the imaginary display area 138 in a vertical direction of the area 138 as indicated by full lines in FIG. 5.

Figure 6:
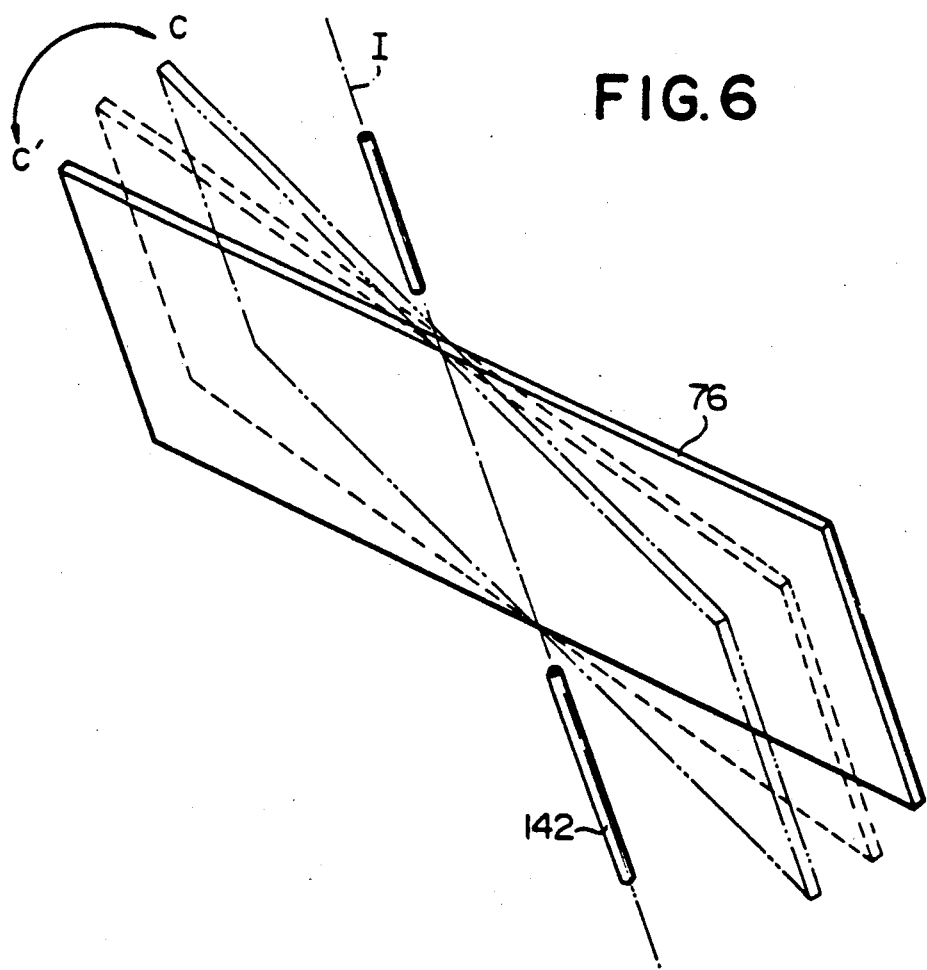
FIG. 6 is a perspective view showing the arrangement in which a second rockable reflector mirror further forming part of the optical system of the apparatus shown in FIGS. 1 and 2 is rockable.

FIG. 6 is a perspective view showing the arrangement in which the rockable reflector mirror 76 further forming part of the optical system provided in the apparatus shown in FIGS. 1 and 2 is rockable about the axis I which is perpendicular in non-intersecting relationship to the axis H of rotation of the rockable reflector mirror 72.

Figure 7:
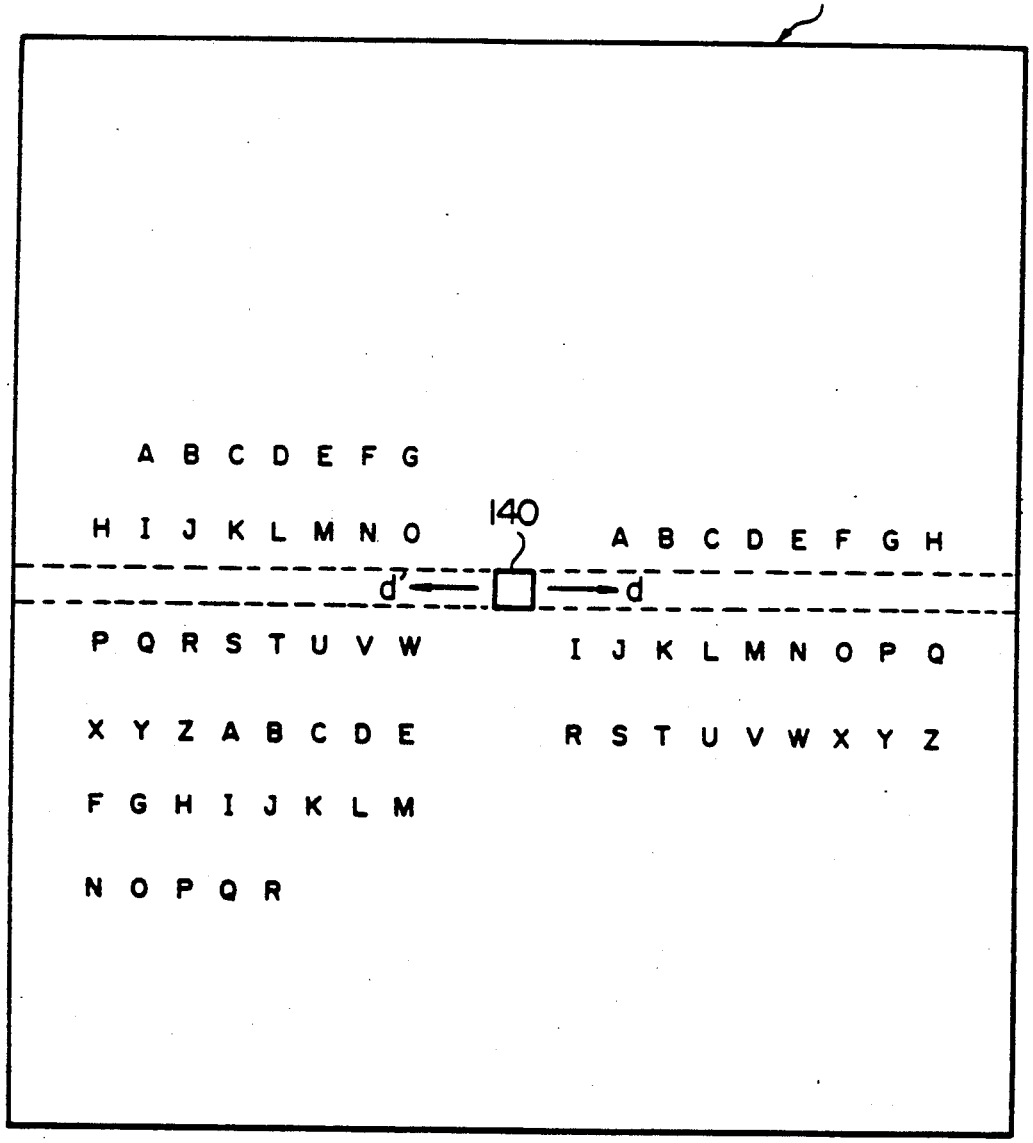
FIG. 7 is a plan view similar to FIG. 5 but now shows the imaginary display area assumed to be produced at the light receiving plane of the photodetector unit with the second rockable reflector mirror turned in either direction.

As shown, the rockable reflector mirror 76 is supported on a pivot shaft 142 having a center axis coincident with the axis I of rotation of the mirror 76 and is thus rockable about the axis I of the shaft 142 in either direction as indicated by arrowheads c and c'. Though not shown in the drawings, the pivot shaft 142 also has opposite end portions journalled in a suitable manner in any structural member or members of the housing structure 30. FIG. 7 is a view similar to FIG. 5 and thus shows the imaginary display area 138 equivalent to the overall area of the viewing screen 38 and assumed to be produced at the light receiving plane $P_D$ of the photodetector unit 82.

When the rockable reflector mirror 76 is driven to turn in the direction of arrowhead c or c' about the axis I thereof with the reflector mirror 84 held out of the second path of light $B_2$, the imaginary display area 138 equivalent to the overall area of the viewing screen 38 is now moved horizontally with respect to the light sensitive area 140 of the photodetector unit 82. In other words, the light sensitive area 140 of the photodetector unit 82 is moved relative to the imaginary display area 138 horizontally in a direction of arrow d or in a direction of arrow d', respectively, as shown in FIG. 7 when the reflector mirror 76 is driven to turn in the direction of arrowhead c or c' as shown in FIG. 6. When the rockable reflector mirror 76 has a certain angular position about the axis I of turn thereof, the light sensitive area 140 of the photodetector unit 82 will also be located centrally of the imaginary display area 138 in a horizontal direction of the area 138 as indicated by full lines in FIG. 7.

Figure 8:
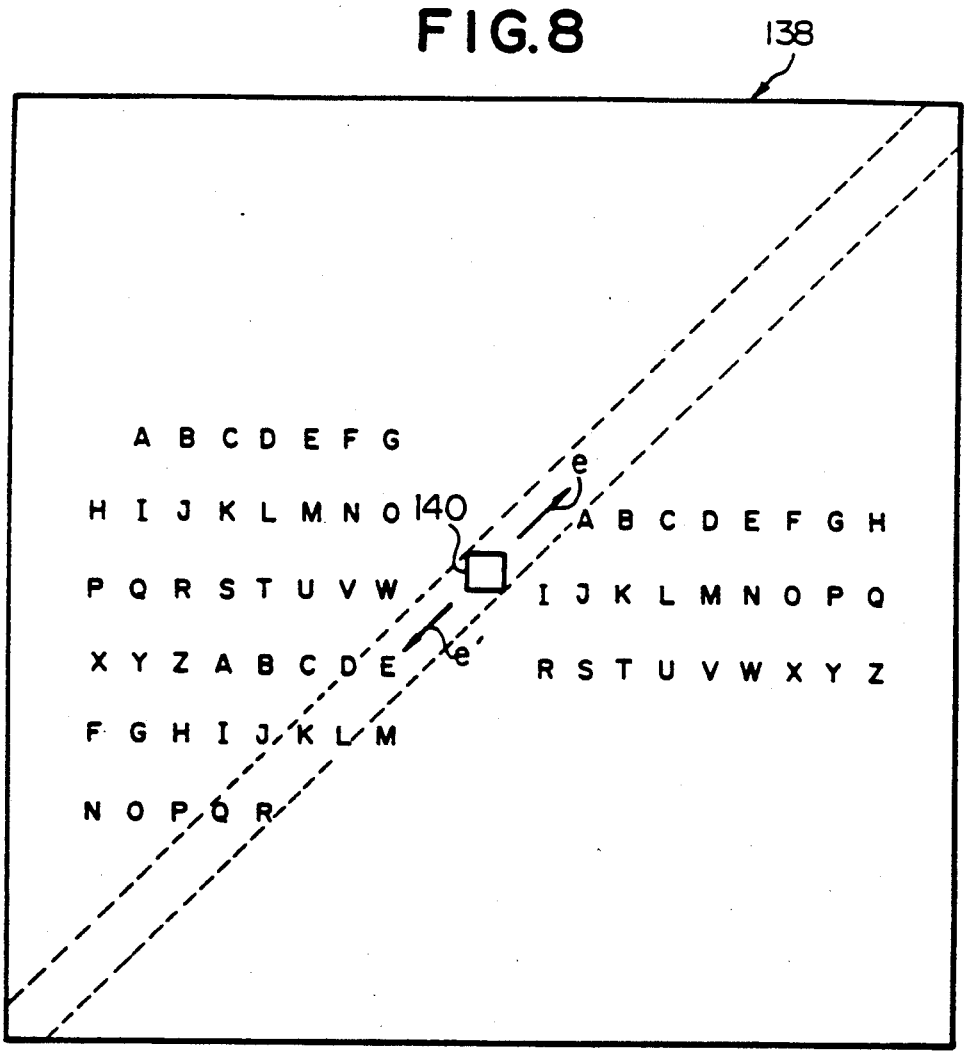
FIG. 8 is a plan view similar to FIGS. 5 and 7 but now shows the imaginary display area assumed to be produced at the light receiving plane of the photodetector unit with both of the first and second rockable reflector mirrors turned each in either direction.

It therefore follows that, when both of the two rockable reflector mirrors 72 and 76 are driven to concurrently turn and through equal angles about the respective axes H and I of turn thereof, the light sensitive area 140 of the photodetector unit 82 will be in effect moved diagonally of the imaginary display area 138 equivalent to the overall area of the viewing screen 38 and assumed to be produced at the light receiving plane $P_D$ of the photodetector unit 82. Thus, when the rockable reflector mirror 72 is driven to turn in the direction of arrowhead a or a' as shown in FIG. 4 and concurrently the reflector mirror 76 is driven to turn in the direction of arrowhead c or c' as shown in FIG. 6, the light sensitive area 140 of the photodetector unit 82 will be moved diagonally of the imaginary display area 138 in a direction of arrow e or in a direction of arrow e', respectively, as shown in FIG. 8. When the two rockable reflector mirrors 72 and 76 respectively have certain angular positions about the axes H and I of rotation thereof, the light sensitive area 140 of the photodetector unit 82 will also be located centrally of the imaginary display area 138 in a diagonal direction of the area 138 as indicated by full lines in FIG. 8.

The photodetector unit 82 may be implemented by the use of a two-dimensional or linear array of appropriate photoelectric transducer elements such as, for example, photoelectric cells, photoconductive transducers, photodiodes, phototransistors or charge-coupled devices (CCD) arranged to implement a through-the-lens (TTL) configuration. Such a photodetector unit 82 of the through-the-lens configuration may be constructed to allow detection of the contrasts of images to result from the incident beam of light at different locations of the path of light or detection of the phase differences of the incident beam at different locations of the path of light. FIG. 9 shows an example of the photodetector unit 82 which operates through detection of the differences in contrast.

Referring to FIG. 9, the photodetector unit 82 comprises first and second half mirrors 144 and 146 and first, second and third two-dimensional arrays 148, 150 and 152 of charge-coupled devices. The first half mirror 144 is of the type having the transmission-to-reflection ratio of 2:1 and is disposed at 45 degrees to the path of $B_2$ of the information-carrying beam travelling from the focusing lens 68. The second half mirror 146 is of the type having the transmission-to-reflection ratio of 1:1 and is also disposed at 45 degrees to the second path of light $B_2$ from the second rockable reflector mirror 76. The first array 148 of charge coupled devices is responsive to the light reflected from the first half mirror 144 and is, in effect, located a predetermined distance $d_1$ ahead of a fixed plane at which the beam of light incident on the photodetector unit 82 is to be correctly focused by the projection lens 68. Such a fixed plane is in effect coincident with the light receiving plane $P_D$ of the photodetector unit 82 and is thus indicated as such in FIG. 9. The second array 150 of charge-coupled devices is responsive to the light transmitted through the first half mirror 144 and reflected from the second half mirror 146 and is, in effect, located at the plane $P_D$ on which the beam of light incident on the photodetector unit 82 is to be correctly focused by the projection lens 68. The third array 152 of charge-coupled devices is responsive to the light transmitted through the second half mirror 146 and is, in effect, located a predetermined distance $d_2$ behind the plane $P_D$ on which the beam of light incident on the photodetector unit 82 is to be correctly focused by the projection lens 68. The effective distance $d_1$ between the first and second arrays 148 and 150 of charge-coupled devices along the light paths to the arrays 148 and 150 is herein assumed to be equal to the effective distance $d_2$ between the second and third arrays 150 and 152 of charge-coupled devices along the light paths to the arrays 150 and 152.

The individual charge-coupled devices forming each of the first, second and third CCD arrays 148, 150 and 152 are arranged in rows and columns and are thus operative to produce signals $S_F$ indicative of the intensities of light at the crossings of such rows and columns when irradiated with the beam of light from any of the half mirrors 60 and 62. Thus, the signals $S_F$ produced from the charge-coupled devices of each CCD array include a signal indicative of the maximum intensity $L_{max}$ and a signal indicative of the minimum intensity $L_{min}$ of the light incident on the CCD array. The charge-coupled devices forming each of the CCD arrays 148, 150 and 152 are electrically connected to the control circuit 112 which receives the signals $S_F$ produced from the charge coupled devices of each CCD array. From the signals $S_F$ supplied from each of the arrays 148, 150 and 152 of charge-coupled devices, the control circuit 112 determines the maximum and minimum intensities $L_{max}$ and $L_{min}$ of the light incident on each CCD array and calculates from these values the image contrast $C_s$ for each CCD array. This image contrast $C_s$ is given as the differential light intensity between L. the maximum and minimum intensities $L_{max}$ and $L_{min}$ of light, hence $$C_s = L_{max} - L_{min} \qquad \text{Eq. 1}$$

Figure 10A:
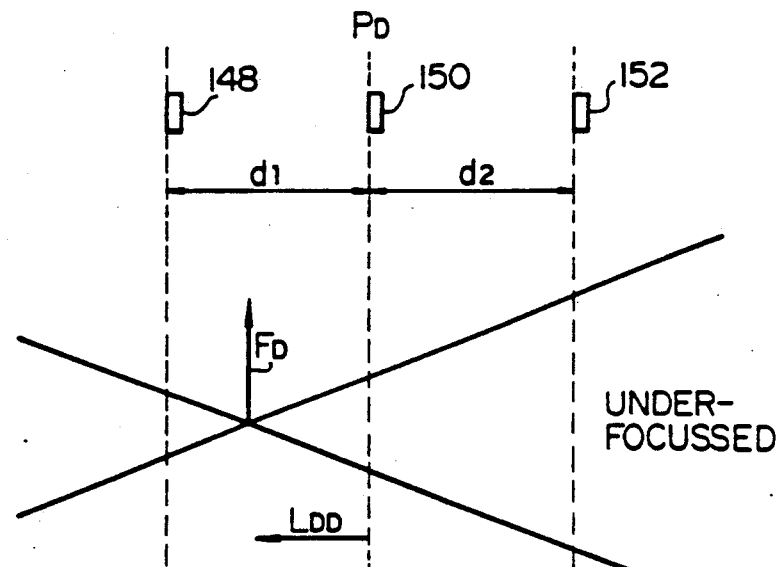
FIGS. 10A, 10B and 10C are diagrams showing different locations at which a beam of light is focussed by the focusing lens incorporated in the apparatus shown in FIGS. 1 and 2 with respect to the plane on which the beam of light incident on the photodetector unit is to be found when the beam is correctly focused.
Figure 10B:
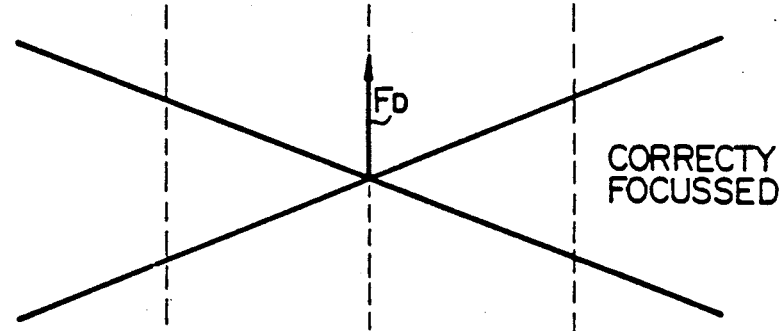
Figure 10C:
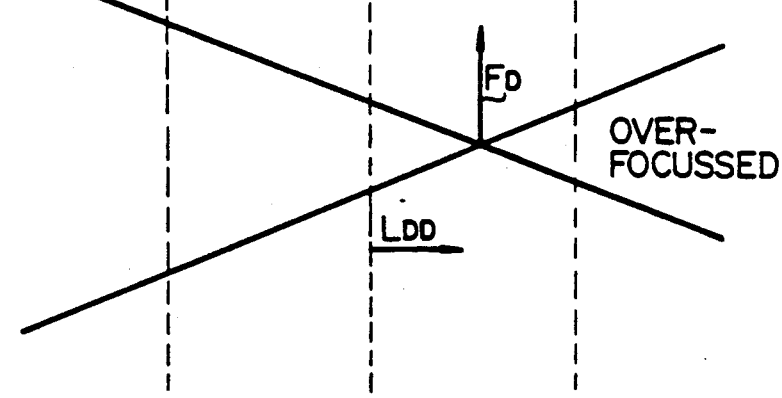

Image contrasts $C_{sa}$, $C_{sb}$ and $C_{sc}$ are thus determined in respect of the first, second and third CCD arrays 148, 150 and 152, respectively, of the photodetector unit 82. These image contrasts $C_{sa}$, $C_{sb}$ and $C_{sc}$ differ from one another and any one of these must be larger than the others. This largest image contrast $C_{sa}$, $C_{sb}$ or $C_c$ must have resulted from the CCD array 148, 150 or 152 on which the incident beam of light is focussed. If the image contrast $C_{sa}$ determined in respect of the first array 148 of charge-coupled devices is the largest, this means that the incident beam of light is focussed on or in the vicinity of the first CCD array 148 as shown in FIG. 10A. Such a beam of light is "under-focussed" with respect to the plane $P_D$ on which the beam of light incident on the photodetector unit 82 is to be correctly focused by the projection lens 68. If the image contrast $C_{sb}$ determined in respect of the second array 150 of charge coupled devices is the largest, then the incident beam of light must be focussed on or in the vicinity of the second CCD array 150 as shown in FIG. 10B. Such a beam of light is correctly focussed with respect to the plane $P_D$. If the image contrast $C_{sc}$ determined in respect of the third array 152 of charge-coupled devices is the largest, the incident beam of light must be focussed on or in the vicinity of the third CCD array 152 as shown in FIG. 10C. Such a beam of light is "over-focussed" with respect to the plane $P_D$ on which the beam of light incident on the photodetector unit 82 is to be correctly focused by the projection lens 68. FIG. 11 shows the image contrast $C_s$ determined at various locations with respect to the plane $P_D$ when the beam of light is under-focussed (curve Ca), correctly focussed (curve Cb) and over-focussed (curve Cc).

When the beam of light is correctly focussed as shown in FIG. 10B, the image contrast $C_{sb}$ determined in respect of the second CCD array 150 is larger than the image contrasts $C_{sa}$ and $C_{sc}$ determined in respect of the first and third CCD arrays 148 and 152 and the image contrasts $C_{sa}$ and $C_{sc}$ determined in respect of these first and third CCD arrays 148 and 152 are equal to each other ($=C_{so}$) as will be seen from curve Cb. When the beam of light is under-focussed as shown in FIG. 10A, the image contrast $C_{sa}$ determined in respect of the first CCD array 148 is larger than the image contrast $C_{sc}$ determined in respect of the third CCD array 152 as will be seen from curve Ca. When the beam of light is over-focussed as shown in FIG. 10C, the image contrast $C_{sc}$ determined in respect of the third CCD array 152 is larger than the image contrast $C_{sa}$ determined in respect of the first CCD array 148 as will be seen from curve Cc. From the relationship between the image contrasts $C_{sa}$, $C_{sb}$ and $C_{sc}$ determined in respect of the first, second and third CCD arrays 148, 150 and 152, respectively, of the photodetector unit 82, the control circuit 112 detects whether the beam of light incident on the photodetector unit 82 is correctly focussed, under-focussed or over-focussed with respect to the light receiving plane $P_D$ of the photodetector unit 82. Thus, the control circuit 112 may output a signal $S_{Fa}$ indicating that the incident beam of light is under-focussed, a signal $S_{Fb}$ indicating that the incident beam of light is correctly focussed, or a signal $S_{Fc}$ indicating that the incident beam of light is over-focussed with respect to the light receiving plane $P_D$ of the photodetector unit 82. On the basis of these signals $S_{Fa}$, $S_{Fb}$ and $S_{Fc}$ as well as the signals $S_{PL}$, $S_{M1}$, $S_{M2}$ and $S_{M3}$ from the detectors 104, 106, 108 and 110, respectively, the control circuit 112 may produce the control signals $T_{M1}$, $T_{M2}$, $T_{M3}$ and $T_{PL}$ to activate the mirror and lens drive units 96, 98, 100 and 94 to drive the reflector mirrors 72, 76 and 84 and projection lens 68 so that the beam of light passed through the lens 68 is correctly focused on the photodetector unit 82 and accordingly on the viewing screen 38.

As will be understood from the foregoing description, the information produced by the photodetector unit 82 is utilized not only for the adjustment and re-adjustment of the positions of the projection lens 68 and reflector mirrors 72, 76 and 84 but also for the adjustment and re-adjustment of the positions of the condenser lenses 62, 66. In the microfilm reader-printer apparatus under consideration, the image information produced by the photodetector unit 82 is further used for the automatic exposure control or automatic margin erasure or for the discrimination between the negative and positive of the image frames of a microfiche used in the printer apparatus. Such information may be also used for the automatic centering of an image frame on the microfiche F with respect to the optical axis of the projection lens 68.

Figure 12:
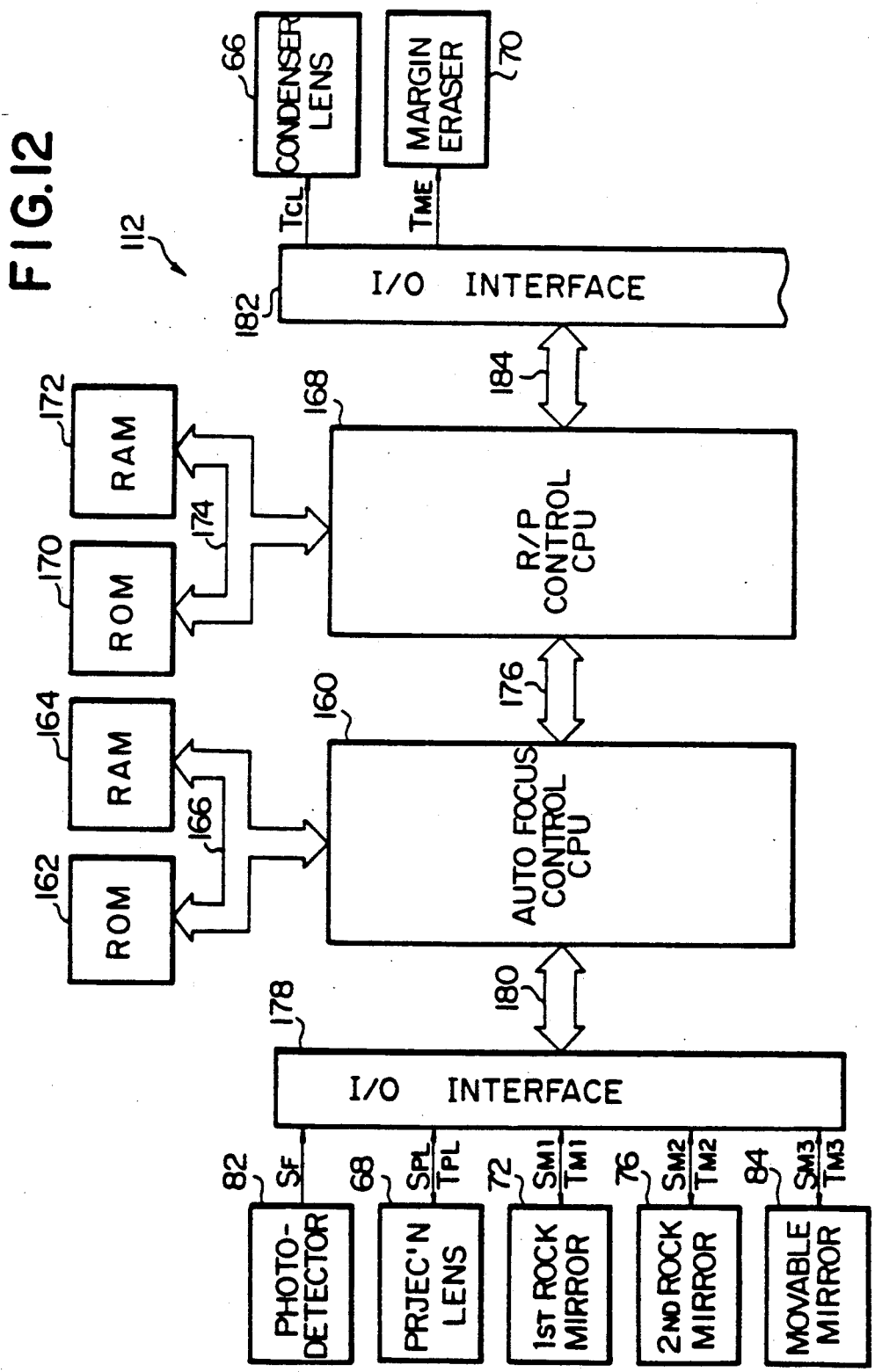
FIG. 12 is a block diagram schematically showing the general configuration of a preferred example of the control circuit included in the arrangement of FIG. 2.

FIG. 12 shows the general configuration of a preferred example of the control circuit 112 in the arrangement described with reference to FIG. 2. The control circuit 112 largely consists of a lens/mirror position control section and a read/print control section. The lens/mirror position control section comprises a lens/mirror position control or, as hereinafter referred to, automatic focus control central processing unit 160 connected to a read-only memory 162 and a random-access memory 164 through a bidirectional bus 166. Similarly, the read/print control section comprises a central processing unit 168 connected to a read-only memory 170 and a random-access memory 172 through a bidirectional bus 174. The central processing units 160 and 168 are connected together through a bidirectional bus 176. The central processing units 160 forming part of the automatic focus control section is further connected to an input/output interface buffer 178 through a bidirectional bus 180 and, likewise, the central processing unit 168 forming part of the read/print control section is further connected to an input/output interface buffer 182 by way of a bidirectional bus 174 as shown.

To the input/output interface buffer 178 of the automatic focus control section of the control circuit 112 are supplied the signals $S_F$ by the photodetector unit 82, the signal $S_{PL}$ produced by the lens position detector 104, and the signal $S_{M1}$, $S_{M2}$ and $S_{M3}$ produced by the mirror position detectors 106, 108 and 110, respectively, are supplied to a control circuit 112 On the basis of the signals $S_F$ from the photodetector unit 82 and the signals $S_{PL}$, $S_{M1}$, $S_{M2}$ and $S_{M3}$ from the detectors 104, 106, 108 and 110, respectively, the central processing unit 160 produces the control signals $T_{PL}$, $T_{M1}$, $T_{M2}$ and $T_{M3}$ to control the drive units 94, 96, 98 and 100 for the projection lens 68, rockable reflector mirrors 72 and 76, and movable reflector mirror 84, respectively. The input/output interface buffer 182 of the read/print control section of the control circuit 112 is responsive to any of the control signals $T_{PL}$, $T_{M1}$, $T_{M2}$ and $T_{M3}$ or directly to any of the signals $S_F$, $S_{PL}$, $S_{M1}$, $S_{M2}$ and $S_{M3}$ to produce the control signals $T_{CL}$ and $T_{ME}$ to control the drive unit 92 for the condenser lens 66 and the drive unit 102 for the marginal mask member 70, respectively.

Figure 13A:
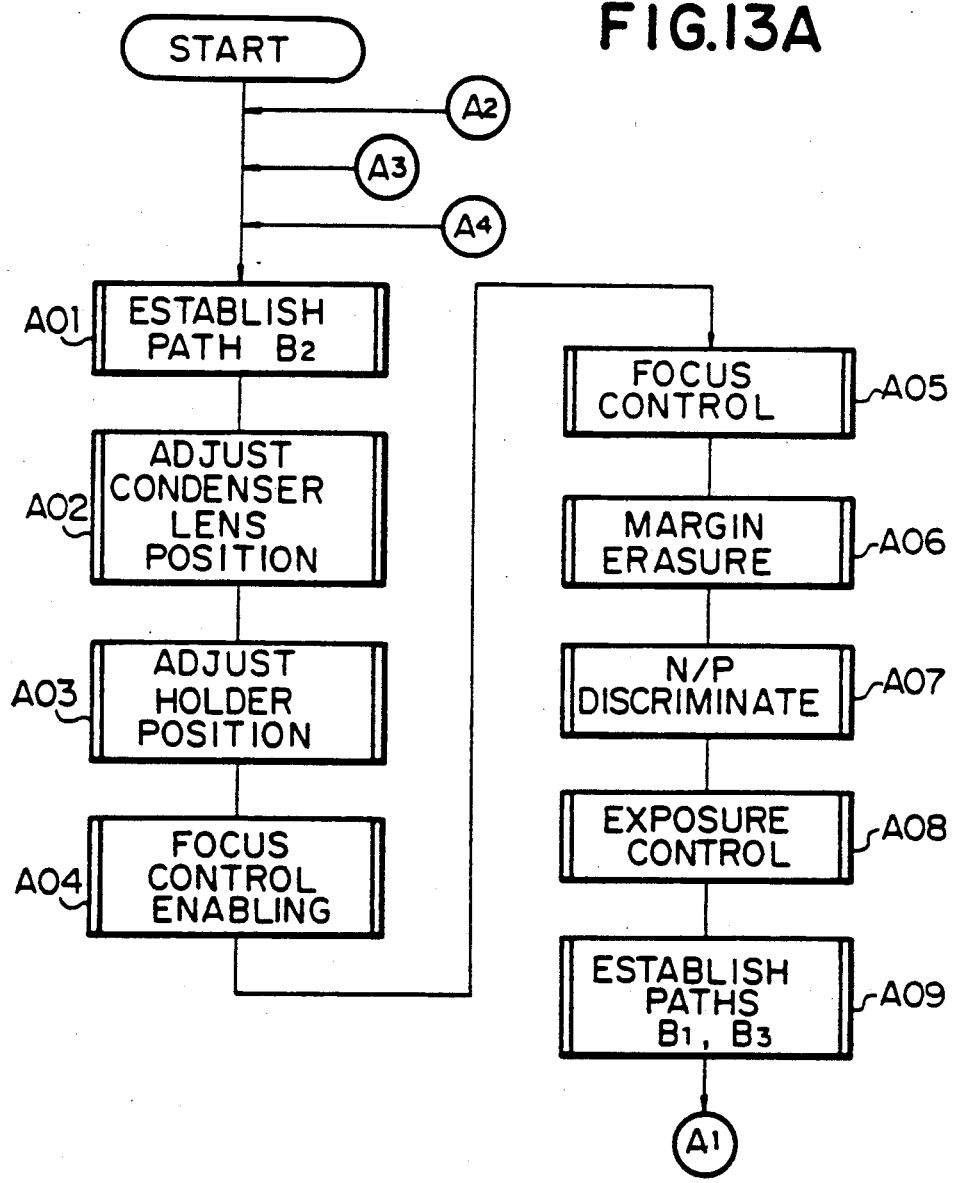

FIGS. 13A and 13B show an example of the main routine program which may be executed in the in the image projector apparatus embodying the present invention under the control of the central processing units 160 and 168 included in the control circuit 112 hereinbefore described with reference to FIG. 12.

The routine program illustrated in FIGS. 13A and 13B is started when the apparatus is switched and first executes a subroutine program A01 to select and/or maintain the second path of light $B_2$ from the first rockable reflector mirror 72 toward the second rockable 76 with the movable reflector mirror 84 withdrawn from the path $B_2$. The purpose of this subroutine program A01 is to establish conditions enabling the detection of focal point of the light incident on the photodetector unit 82 to determine whether the incident light is correctly focussed, under-focussed or over-focussed. The subroutine program A01 is executed under the control of the automatic focus control central processing unit 160 and will be hereinafter described in more detail with reference to FIG. 14.

Subsequently to the subroutine program A01 may be executed a condenser lens position adjust subroutine program A02 to adjust the axial position of the condenser lens 54 with respect to the projection lens 68. This subroutine program A02 is executed on the basis of the signals $S_F$ from the photodetector unit 82 with the first and second reflector mirrors 72 and 76 driven to turn to swing with respect to the previously mentioned imaginary display area 138. The subroutine program A02 is executed under the cooperative control of both of the automatic focus and read/print control central processing units 160 and 168 and will be hereinafter described in more detail with reference to FIGS. 15, 16 and 17.

The subroutine program A02 may be followed by a holder position adjust subroutine program A03 to adjust the position of the microfiche holder assembly 52 which may thus be driven to horizontally move forwardly or rearwardly, or leftwardly or rightwardly so that any desired one of the image frames on the microfiche F carried thereon can be brought into alignment with the beam of light passing through the assembly 52. The holder position adjust subroutine program A03 is executed under the control of the read/print control central processing unit 168 responsive to a signal from the automatic focus control central processing unit 160 and will not be herein further described since the details of the subroutine program are rather immaterial to the understanding of the gist of the present invention.

The main routine program may further proceed to a focus control enabling subroutine program A04 through execution of which the first and second rockable reflector mirrors 72 and 76 are driven to turn so that the light sensitive area 140 of the photodetector unit 82 is located centrally of the imaginary display area 138 in a diagonal direction of the area 138 as indicated by full lines in FIG. 8. The purpose of this subroutine program A04 is to establish conditions enabling the focus control of the light to be incident on the photodetector unit 82. This subroutine program A04 is executed also on the basis of the signals $S_F$ from the photodetector unit 82 and is executed under the control of the automatic focus control central processing unit 160 and will be hereinafter described in more detail with reference to FIGS. 18 and 19.

The subroutine program A04 may be followed by a focus control subroutine program A05 by which the automatic focus control central processing unit 160, responsive to the signals $S_F$ supplied from the photodetector unit 82, determines whether the light incident on the photodetector unit 82 is correctly focussed, under-focussed or over-focussed with respect to the light receiving plane $P_D$ of the photodetector unit 82. If it is determined that the light incident on the photodetector unit 82 is under-focussed or over-focussed with respect to the plane $P_D$, the central processing unit 160 produces a control signal $T_{PL}$ effective to activate the lens drive unit 94 to drive the projection lens 68 for axial movement away from or toward the microfiche F intervening between the holder plates 54 and 54' until the light incident on the photodetector unit 82 is found to be correctly focussed with respect to the plane $P_D$. This focus control subroutine program A02 is executed also under the control of the automatic focus control central processing unit 160 and will be hereinafter described in more detail with reference to FIG. 20.

Subsequently to the focus control subroutine program A05 may be executed a margin erase subroutine program A06 to move the marginal mask member 70 with respect to the path of light from the projection lens 68 depending on the boundary between the image and non-image responsive zones of the imaginary display area 138. This margin erase subroutine program A06 is executed also on the basis of the signals $S_F$ from the photodetector unit 82 with the first and second reflector mirrors 72 and 76 driven to turn to move the light sensitive area 140 of the photodetector unit 82 with respect to the previously mentioned imaginary display area 138. The subroutine program A06 is executed under the cooperative control of both of the automatic focus and read/print control central processing units 160 and 168 and will be hereinafter described in more detail with reference to FIGS. 21, 22, 23 and 24.

The margin erase subroutine program A06 may be followed by a negative/positive discriminate subroutine program A07 to discriminate the microfiche F currently in use between the negative and positive types. This negative/positive discriminate subroutine program A07 is executed under the cooperative control of both of the automatic focus and read/print control central processing units 160 and 168 and will be hereinafter described in more detail with reference to FIG. 25.

Upon termination of the negative/positive discriminate subroutine program A07, the main routine program may proceed to an exposure control subroutine program A08 to control the voltage $V_{LAMP}$ with which the illumination lamp 58 of the light source assembly 56 is to be energized. The exposure control subroutine program A08 is executed under the control of the automatic focus control central processing unit 160 and will be hereinafter described in more detail with reference to FIG. 26. The main routine program may then proceed to a first/third-path-of-light select subroutine program A09 through execution of which the first and third paths of light $B_1$ and $B_3$ from the first rockable reflector mirror 72 to the viewing screen 38 and photosensitive drum 90 are selected in lieu of the second path of light $B_2$. The purpose of this first/third-path-of-light select subroutine program A09 is to establish conditions enabling the read and/or print operation for the microfiche loaded into the apparatus. The subroutine program A09 is executed under the control of the automatic focus control central processing unit 160 and will be hereinafter described in more detail with reference to FIG. 27.

Upon termination of the subroutine program A09, the main routine program proceeds through a connector $A_1$ to a decision step A10 shown in FIG. 13B to confirm whether or not there is a signal requesting the start of printing operation. This print start request signal is produced with the print start switch manually depressed on the control panel 42 (FIG. 1). If it is found at this step A10 that there is such a signal currently present, the print operation is started at step A11 with the photosensitive drum 90 and various associated units of the drum 90 activated under the control of the read/print control central processing unit 168. When the printing operation is complete, the routine program returns to the preceding step A10 and may repeat the loop of the steps A10 and A11 until the answer for the step A10 turns negative.

When the answer for the step A10 is thus given in the negative, then the main routine program proceeds to step A12 to check if the microfiche currently in use has been moved and a new image frame is located in the path of light passing through the holder assembly 52. If the answer for the step A12 is given in the affirmative, the routine program returns through a connector $A_3$ to the subroutine program A01 to repeat the subroutine programs A01 to A09. If the answer for the step A12 is given in the negative, then the routine program proceeds to step A13 to check if the microfiche which has been in use is exchanged with a new one in the microfiche holder assembly 52. If the answer for the step A13 is given in the affirmative, the routine program also returns through a connector $A_3$ to the subroutine program A01 to repeat the subroutine programs A01 to A09. If the answer for the step A13 is given in the negative, then the routine program proceeds to step A14 to check if the projection lens 68 which has been used is exchanged with a new one in the lens casing 120. The decision for this step A14 may be made depending on the signal $S_{PL}$ from the lens position detector 104 associated with the projection lens 68. Alternatively, the decision for the step A14 may be made through detection of the movement of the front door 120a of the lens casing 120 (FIG. 3) which is to be opened up to provide access to the lens assembly within the casing 120 when it is desired to have the lens 68 exchange with another one. For this purpose, a detector 154 responsive to opening and/or closing movement of the door 120a may be provided within the lens casing 120 as shown in FIG. 3.

If the answer for the step A14 is given in the affirmative, the routine program also returns through a connector $A_4$ to the subroutine program A01 to repeat the subroutine programs A01 to A09. If the answer for the step A14 is given in the negative, then the routine program returns to step A10. The routine program is thus executed repeatedly until the apparatus is finally switched off.

SECOND PATH-OF-LIGHT SELECT SUBROUTINE PROGRAM (A01)

When the apparatus embodying the present invention as shown in FIGS. 1 and 2 is switched on with the power supply switch 46 (FIG. 1) manually depressed, the illumination lamp 58 of the light source assembly 56 is activated to glow so that a collimated light travelling through the condenser lens 62, reflector mirror 64 and condenser lens 66 passes through the transparent microfiche holder plates 54 and 54' of the microfiche holder assembly 52. The subroutine program A01 is then executed to select and/or maintain the second path of light $B_2$ from the first rockable reflector mirror 72 toward the second rockable reflector mirror 76 with the movable reflector mirror 84 withdrawn from the path $B_2$.

Referring to FIG. 14, it is thus first detected at step B01 whether or not the second path of light $B_2$ from the rockable reflector mirror 72 to the photodetector unit 82 is established with the movable reflector mirror 84 held in the position withdrawn from the path of light $B_2$ from the mirror 72. This detection is made on the basis of the signal $S_{M3}$ from the position detector associated with the movable reflector mirror 84 and adapted to produce a signal of a certain logic state responsive to the reflector mirror 84 moved out of the path of light $B_2$. When it is found that the second path of light $B_2$ is established, the subroutine program A01 returns to the main routine program. If it is found at the step B01 that the movable reflector mirror 84 is located in the second path of light $B_2$, then the step B01 is followed by a step B02 at which the mirror drive unit 100 is activated to drive the mirror 84 out of the second path of light $B_2$. After the reflector mirror 84 is thus moved out of the path of light $B_2$, the subroutine program A01 returns to step B01 and may thus return through the step B01 to the main routine program.

CONDENSER LENS POSITION ADJUST SUBROUTINE PROGRAM (A02)

Figure 15:
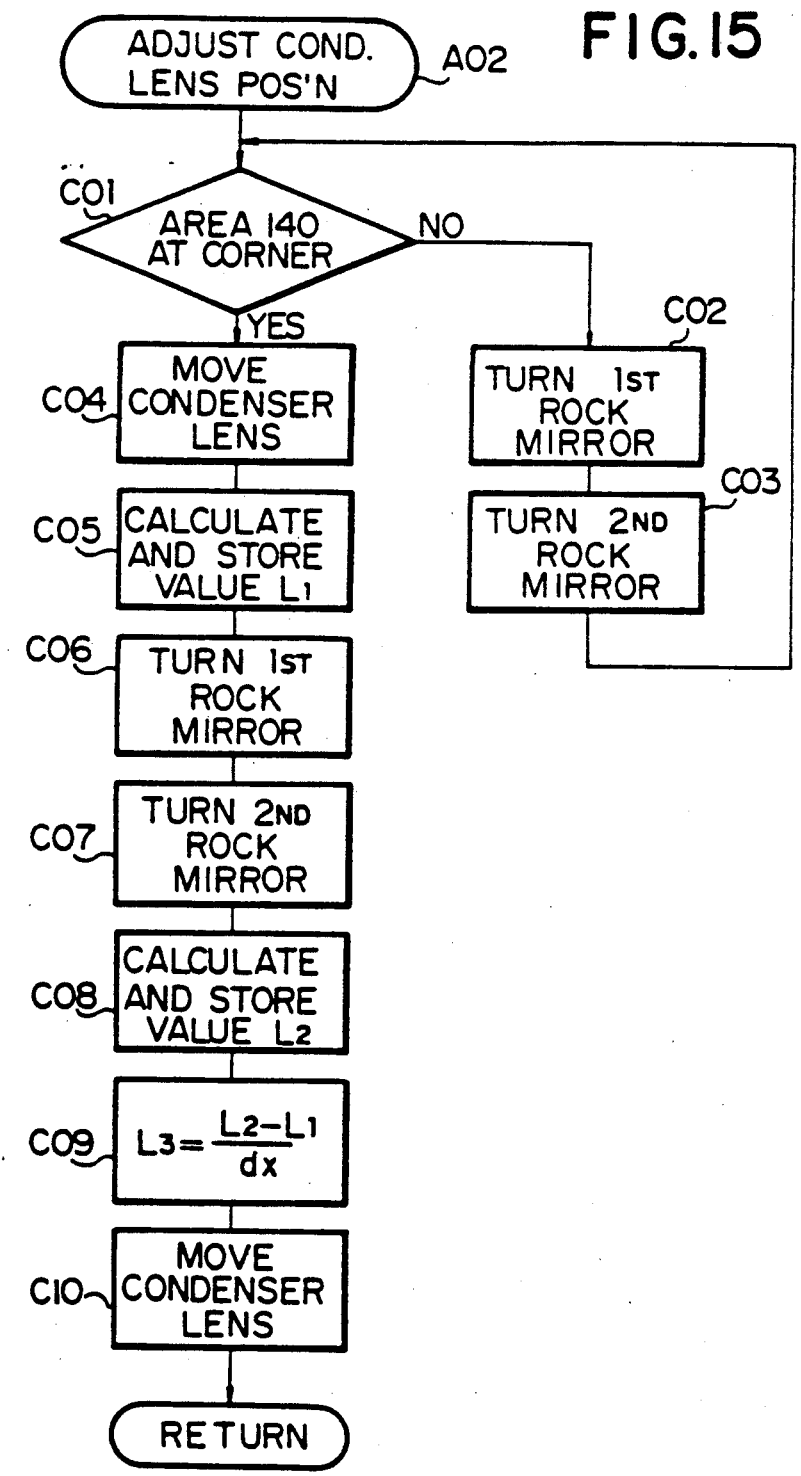
FIG. 15 is a flowchart showing the details of a condenser lens position adjust subroutine program included in the main routine program illustrated in FIGS. 13A and 13B.

Referring to FIG. 15, the condenser lens position adjust subroutine program A02 may then be executed to adjust the axial position of the condenser lens 4 with respect to the projection lens 68. This condenser lens position adjust subroutine program A02 starts with a decision step C01 to confirm whether or not the light sensitive area 140 of the photodetector unit 82 is located at one of the corners of the imaginary display area 138 as indicated at 140a in FIG. 16. This confirmation is made by the automatic focus control central processing unit 160 on the basis of the signals $S_{M1}$ and SM2 from the first and second reflector mirrors 72 and 76 held in certain positions with respect to the imaginary display area 138. If it is found at the step C01 that the light sensitive area 140 of the photodetector unit 82 is not located at one of the corners of the imaginary display area 138, the step C01 is followed by steps C02 and C03 at which the central processing unit 160 outputs the control signals $T_{M1}$ and $T_{M2}$ to the mirror drive units 96 and 98 so that the first and second reflector mirrors 72 and 76 are driven to turn toward the angular positions providing the light sensitive area 140 located at one corner of the imaginary display area 138.

When it is thus determined at step C01 that the light sensitive area 140 of the photodetector unit 82 is located at one corner of the imaginary display area 138, the automatic focus control central processing unit 160 sends an instruction signal to the read/print control central processing unit 168 so that the control signal $T_{CL}$ is supplied from the central processing unit 168 to the lens drive unit 92. The lens drive unit 92 is thus activated at step C04 to drive the condenser lens 66 for axial movement toward or away from the projection lens 68 so that the image circle $C_I$ of the projection lens 68 is enlarged or reduced to a diameter equal to the length of a diagonal line D of the imaginary display area 138 as shown in FIG. 16.

The subroutine program A02 then proceeds to step C05 at which the automatic focus control central processing unit 160 calculates from the signals $S_F$ produced from the charge-coupled devices of the second CCD array 150 a first mean value $L_1$ of the intensities of light detected by the individual charge-coupled devices of the array 150. The first mean value $L_1$ thus calculated of the intensities of the light incident on the second CCD array 150 is stored into the memory 164.

Figure 16:
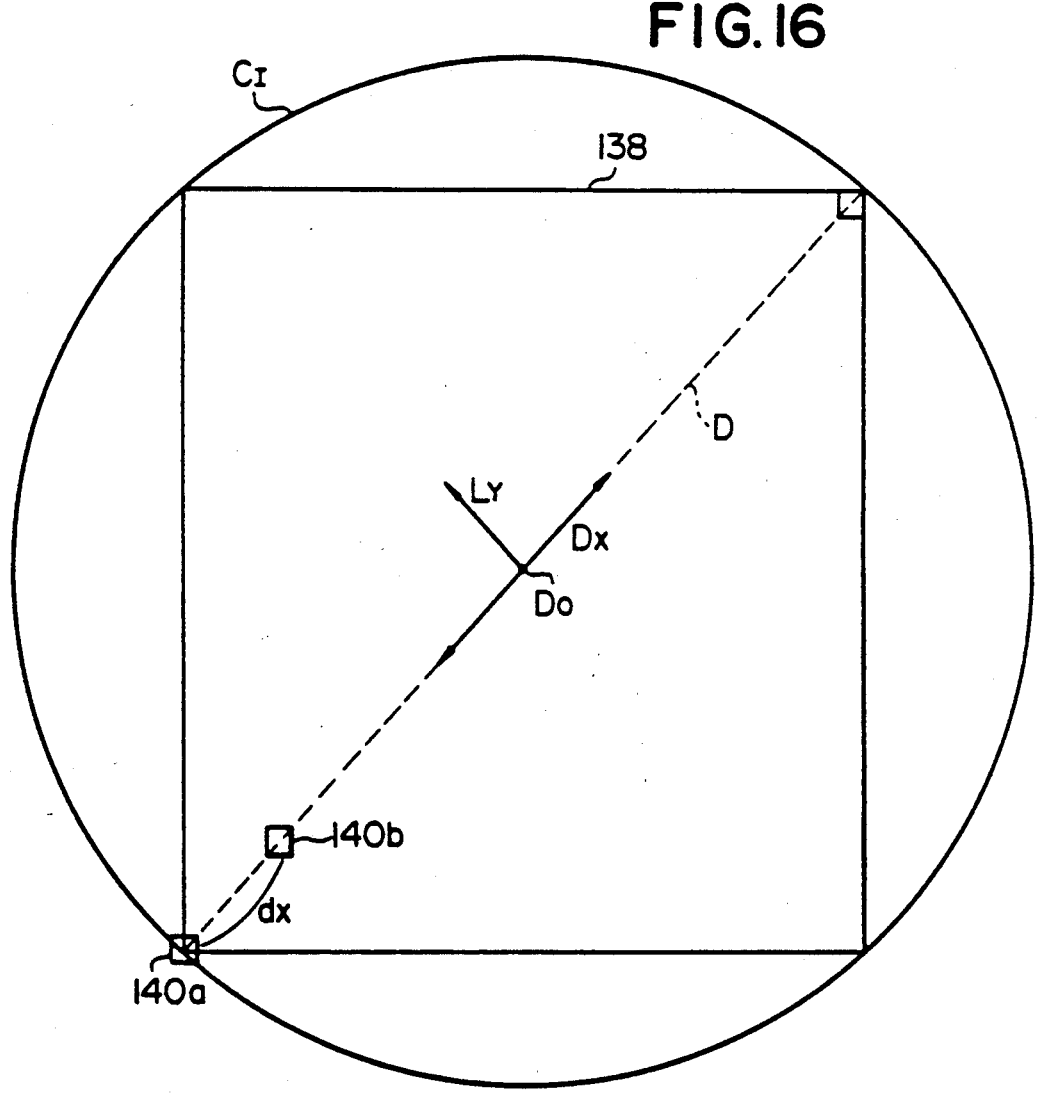
FIG. 16 is a plan view showing the imaginary display area on or with respect to which the light sensitive area of the photodetector unit is to be moved diagonally of the imaginary display area.

The step C05 is followed by steps C06 and C07 at which the automatic focus control central processing unit 160 further outputs the control signals $T_{M1}$ and $T_{M2}$ to the mirror drive units 96 and 98 so that the first and second reflector mirrors 72 and 76 are driven to turn to enable the light sensitive area 140 to move a predetermined distance $d_X$ from the position 140a at one corner of the imaginary display area 138 toward the other corner of the area 138 diagonally of the area 138 as shown in FIG. 16. With the rrf 72 and 76 held in such angular positions, the automatic focus control central processing unit 160 executes step C08 to further calculate from the signals $S_F$ from the second CCD array 150 a second mean value $L_2$ of the intensities of light detected by the individual charge-coupled devices of the array 150. The second mean value $L_2$ thus calculated of the intensities of the light incident on the second CCD array 150 is also stored into the memory 164. The step C08 is followed by a step C09 at which the first and second mean values $L_1$ and $L_2$ of the detected intensities of light are read from the memory 164 by the central processing unit 160 which then calculates the value $L_3$ as follows:

$$L_3 = (L_2 - L_1)/d_X \qquad \text{Eq. 2}$$

Figure 17:
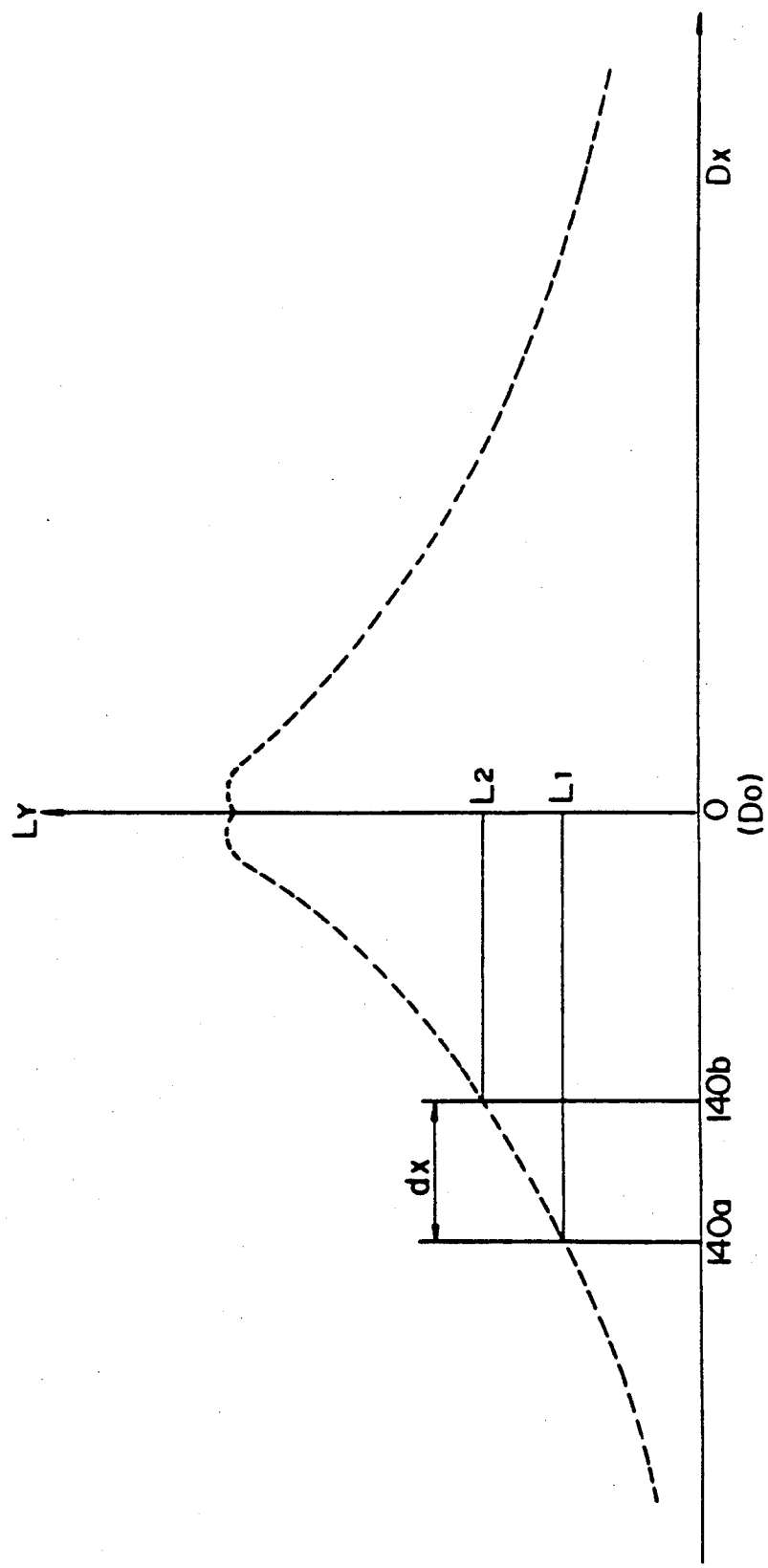
FIG. 17 is a graphic representation of the distribution of the intensities of light detected by an array of charge coupled devices which form part of the photodetector unit illustrated in FIG. 17.

The distribution of the intensities of the light detected by the individual charge-coupled devices of the second CCD array 150 may be such that is indicated by the curve shown in FIG. 17 when represented in terms of the distance from the center point $D_0$ of the diagonal line D of the imaginary display area 138 (FIG. 16). In FIG. 17, the axis of abscissa $D_X$ represents the distance $D_X$ from the center point $D_0$ of the diagonal line D of the imaginary display area 138 and the axis of ordinate represents the intensities of light $L_Y$ detected by the charge-coupled devices located along the line D. The center point $D_0$ of the diagonal line D corresponds to the optical axis of the projection lens 68.

It will be understood that the value $L_3$ calculated in accordance with Eq. 2 is indicative of the rate of increase of the intensity of light $L_Y$ for the distance of movement $d_X$ from the position 140a to position 140b of the light sensitive area 140 of the photodetector unit 82 with respect to the imaginary display area 138. Thus, the value $L_3$ represents the correct position of the condenser lens 66 with respect to the projection lens 68 and is as such transmitted to the read/print control read/print control central processing unit 168 from the automatic focus control central processing unit 160. The read/print control central processing unit 168 calculates from the value $L_3$ the direction and distance of movement of the condenser lens 66 with respect to the projection lens 68 and supplies the control signal $T_{CL}$ to the lens drive unit 92. The lens drive unit 92 is then activated at step C10 to drive the condenser lens 66 for axial movement toward or away from the projection lens 68 in the direction and over the distance determined by the read/print central processing unit 168.

While it has been described that the values $L_1$ and $L_2$ and accordingly the value $L_3$ are calculated on the basis of the signals $S_f$ produced by the second CCD array 150, such values may be obtained from the signals $S_F$ produced by the first or third CCD array 148 or 152 of the photodetector unit 82 described with reference to FIG. 9.

Upon termination of the step C10, the subroutine program A02 returns to the main routine program illustrated in FIGS. 13A and 13B. Subsequently to the subroutine program A02 may be executed the holder position adjust subroutine program A03 in which the read/print control central processing unit 168 receives from the automatic focus control central processing unit 160 a signal allowing loading of a microfiche F into the microfiche holder assembly 52. The read/print control central processing unit 168 then supplies a control signal to a holder drive unit (not shown) to drive the microfiche holder assembly 52 to a position determined on the basis of the data fetched from the memory 170 and entered from the keyboard unit 36 to adjust the position of the microfiche holder assembly 52. The microfiche holder assembly 52 may thus be driven to horizontally move forwardly or rearwardly, or leftwardly or rightwardly so that any desired one of the image frames on the microfiche F carried thereon can be correctly brought into alignment with the beam of light passing through the assembly 52.

FOCUS CONTROL ENABLING SUBROUTINE PROGRAM (A04)

Upon termination of the holder position adjust subroutine program A03, the main routine program may proceed to the focus control enabling subroutine program A04 to establish conditions enabling the focus control of the light to be incident on the photodetector unit 82.

Figure 18:
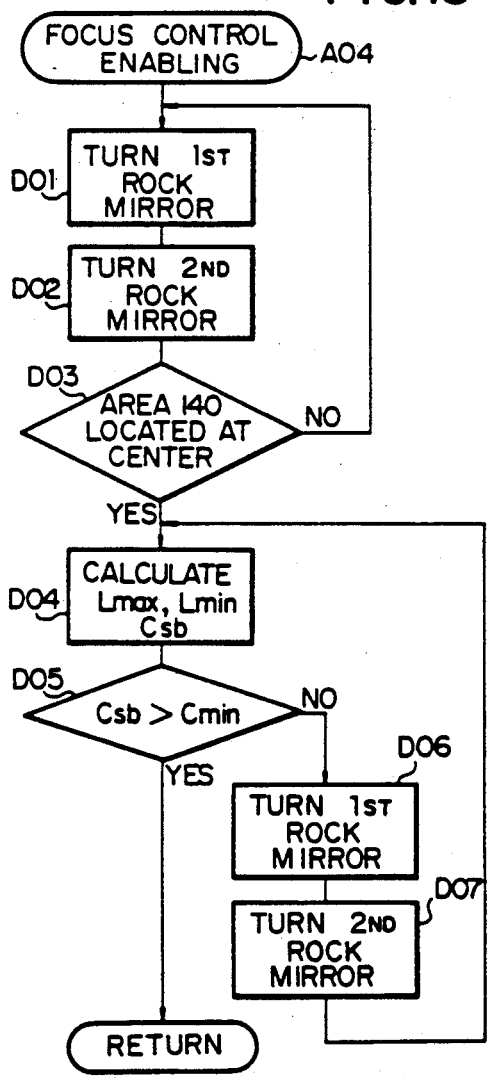
FIG. 18 is a flowchart showing the details of a focus control enabling subroutine program included in the main routine program illustrated in FIGS. 13A and 13B.

As illustrated in FIG. 18, such a focus control enabling subroutine program A04 starts with steps D01 and D02 at which the mirror drive units 96 and 98 are activated to drive the first and second rockable reflector mirrors 72 and 76 to turn about the axes H and I, respectively, of rotation thereof so that the light sensitive area 140 of the photodetector unit 82 is located centrally of the imaginary display area 138 in a diagonal direction of the area 138 as indicated in FIG. 8. Subsequently to the steps D01 and D02 it is confirmed at step D03 whether or not the light sensitive area 140 of the photodetector unit 82 is located centrally of the imaginary display area 138. If the answer for this step D03 is given in the negative, the loop of the step D01 to D03 is repeated until the answer for the step D03 turns affirmative.

When it is determined at step D03 that the light sensitive area 140 of the photodetector unit 82 is located centrally of the imaginary display area 138, the automatic focus control central processing unit 160 determines the maximum and minimum intensities $L_{max}$ and $L_{min}$ of the light incident on the second CCD array 150 of the photodetector unit 82 constructed as described with reference to FIG. 9. These maximum and minimum intensities $L_{max}$ and $L_{min}$ are calculated from the signals $S_F$ supplied from the individual charge-coupled devices of the second CCD array 150 and from these values the central processing unit 160 further calculates the image contrast $C_{sb}$ for the particular array 150 in accordance with the following relationship:

$$C_{sb} = L_{max} - L_{min} \qquad \text{Eq. 1'}$$

The image contrast $C_{sb}$ thus calculated is at step D05 compared with a predetermined lower limit value $C_{min}$ of the differential light intensities read from the memory 162. The differential light intensities are representative of the differences between various maximum and minimum values of the intensities of light which may be incident on the individual charge-coupled devices of the second CCD array 150. When the image contrast $C_{sb}$ calculated in accordance with Eq. 1' is found to be larger than the lower limit value $C_{min}$ of such differential light intensities, it is determined that the light sensitive area 140 of the photodetector unit 82 is located as indicated at 140c in FIG. 19 and is thus responsive to a beam of light carrying images with a relatively high degree of contrast. In this instance, it is regarded that the focal point of the beam of light B passed through the projection lens 68 may be validly detected from the signals $S_F$ supplied from the photodetector unit 82 and, as such, the subroutine program A04 is followed by the focus control subroutine program A05 of the main routine program.

Figure 19:
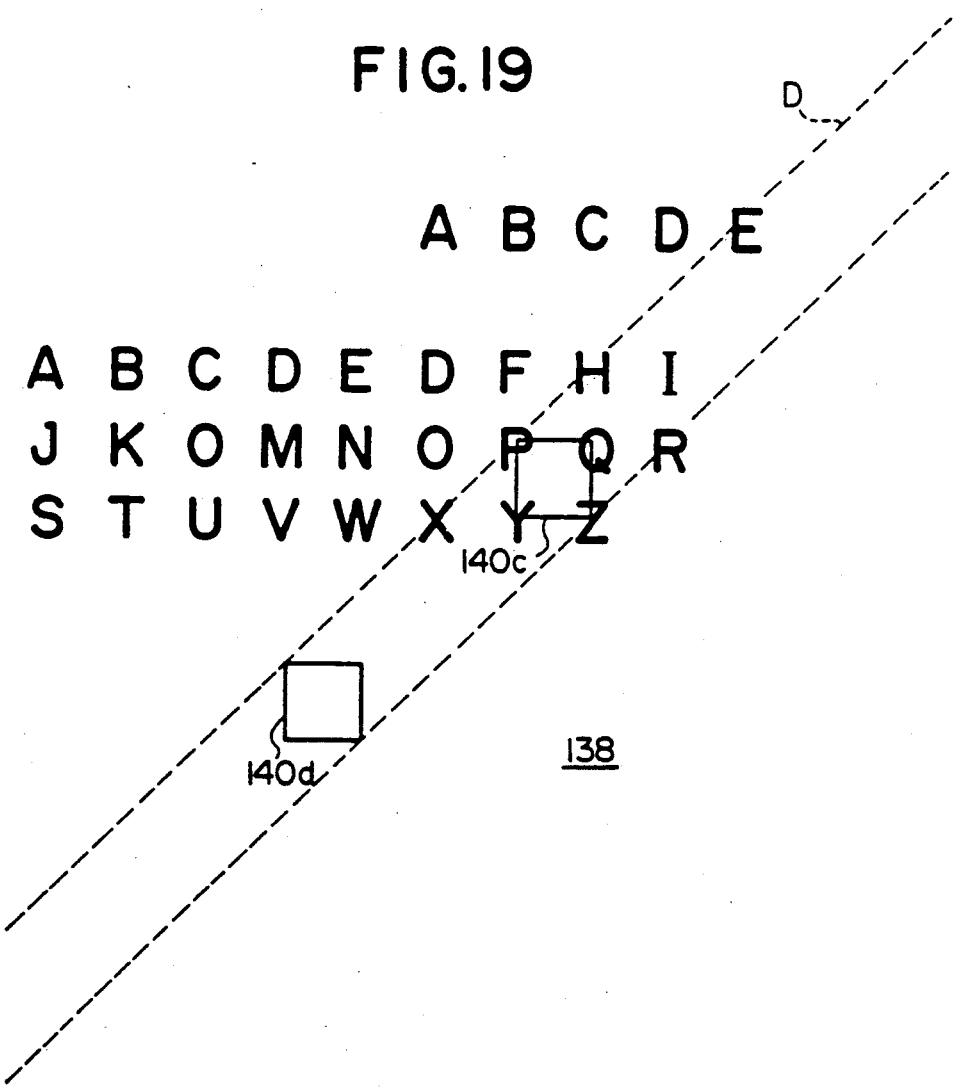
FIG. 19 is a fragmentary plan view showing a portion of the imaginary display area on or with respect to which the light sensitive area of the photodetector unit is to be moved diagonally of the imaginary display area during execution of the focus control enabling subroutine program illustrated in FIG. 18.

If it is found at the step D05 that the image contrast $C_{sb}$ calculated in accordance with Eq. 1' is less than the lower limit value $C_{min}$ of the differential light intensities, it is determined that the light sensitive area 140 of the photodetector unit 82 is located as indicated at 140d in FIG. 19 and is thus responsive to a beam of light carrying no images or carrying images with a relatively low degree of contrast. In this instance, it is regarded that the focal point of the beam of light B passed through the projection lens 68 could not be validly detected from the signals $S_F$ supplied from the photodetector unit 82 and, as such, the subroutine program A04 is followed by steps D06 and D07 at which the mirror drive units 96 and 98 are further activated to drive the first and second rockable reflector mirrors 72 and 76 to turn so that the light sensitive area 140 of the photodetector unit 82 is moved a predetermined unit distance with respect to the imaginary display area 138 in one diagonal direction of the area 138. The loop of the steps D04 to D07 is repeated until the answer for the step D05 turns affirmative with the light sensitive area 140 of the photodetector unit 82 located to be responsive to a beam of light carrying images with a relatively low degree of contrast.

The answer for the step D05 may have failed to turn affirmative after the light sensitive area 140 of the photodetector unit 82 is moved out of the imaginary display area 138. In such an occasion, the reflector mirrors 72 and 76 are driven to turn to move the area 140 back to the center of the imaginary display area 138 and thereupon the loop of the steps D04 to D07 is repeated with the area 140 stepwise moved in the opposite diagonal direction of the area 138 until the answer for the step D05 turns affirmative.

When it is found at the step D05 that the image contrast $C_{sb}$ calculated in accordance with Eq. 1' is larger than the lower limit value $C_{min}$ of the differential light intensities, the subroutine program A04 is terminated and the main routine program proceeds to the focus control subroutine program A05.

FOCUS CONTROL SUBROUTINE PROGRAM (A05)

The focus control subroutine program A05 is executed to enable the automatic focus control central processing unit 160 to determine, responsive to the signals $S_F$ supplied from the photodetector unit 82, whether the light incident on the photodetector unit 82 is correctly focussed, under-focussed or over-focussed with respect to the light receiving plane $P_D$ of the photodetector unit 82.

Figure 20:
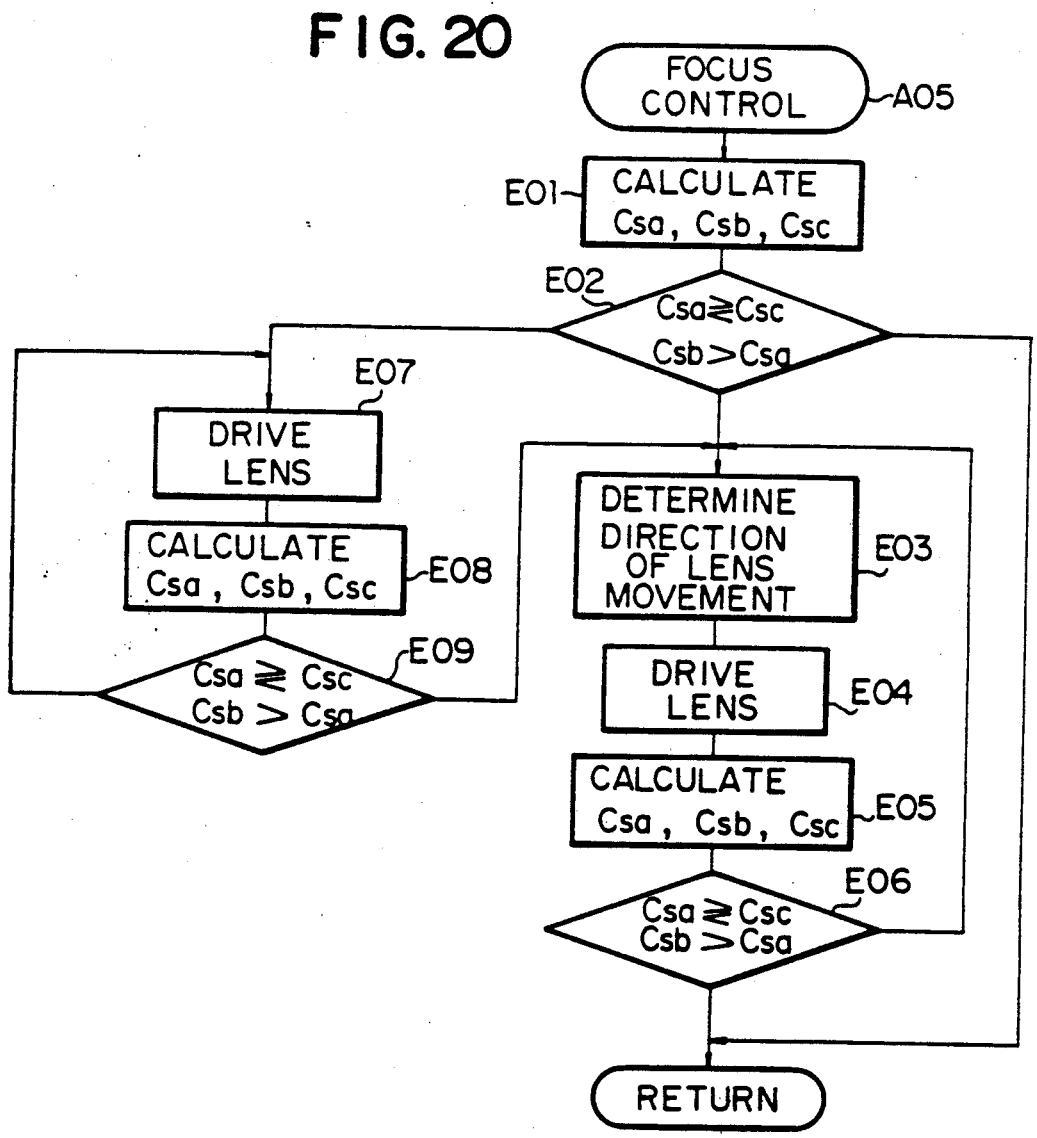
FIG. 20 is a flowchart showing the details of a focus control subroutine program included in the main routine program illustrated in FIGS. 13A and 13B.

Turning to FIG. 20, the focus control subroutine program A05 starts with a step E01 to calculate the contrast $C_s$ of the image to result from the light incident on each of the first, second and third arrays 148, 150 and 152 of charge coupled devices in the photodetector unit 82 shown in FIG. 3. From the signals $S_F$ supplied from each of the arrays 148, 150 and 152 of charge-coupled devices, the automatic focus control central processing unit 160 determines the maximum and minimum intensities $L_{max}$ and $L_{min}$ of the light incident on each CCD array and calculates from these values the image contrast $C_s$ for each CCD array in accordance with Eq. 1. The automatic focus control central processing unit 160 then calculates the image contrasts $C_{sa}$, $C_{sb}$ and $C_{sc}$ in respect of the first, second and third CCD arrays 148, 150 and 152, respectively, of the photodetector unit 82. These image contrasts $C_{sa}$, $C_{sb}$ and $C_{sc}$ are then compared with one another at a subsequent step E02 to determine if the image contrast $C_{sa}$ calculated in respect of the first CCD array 148 is larger or smaller than the image contrast $C_{sc}$ calculated in respect of the third CCD array 152, and if the image contrast $C_{sb}$ calculated in respect of the second CCD array 150 is larger than the image contrast $C_{sa}$ calculated in respect of the first CCD array 148.

When the image contrast $C_{sa}$ calculated in respect of the first CCD array 148 is found to be neither larger or nor smaller than the image contrast $C_{sc}$ calculated in respect of the third CCD array 152 and the image contrast $C_{sb}$ calculated in respect of the second CCD array 150 found to be larger than the image contrast $C_{sa}$ calculated in respect of the first CCD array 148, it is determined that the image contrast $C_{sa}$ is equal to the image contrast $C_{sc}$ and the image contrast $C_{sb}$ is larger than the image contrast $C_{sa}$. This meaning that the incident light is correctly focussed with respect to the plane $P_D$, the execution of the subroutine program A05 is terminated and the main routine program illustrated in Figs. 13A and 13B is executed continuedly.

If it is found at step E02 that the image contrast $C_{sa}$ calculated in respect of the first CCD array 148 is larger or smaller than the image contrast $C_{sc}$ calculated in respect of the third CCD array 152, it is determined that the incident light is under-focussed or over-focussed with respect to the plane $P_D$. In this occasion, the step E02 is followed by step E03 at which the direction in which the projection lens 68 is to be driven for movement with respect to the microfiche F in the microfiche holder assembly 52 is determined depending on whether the image contrast $C_{sa}$ is larger or smaller than the image contrast $C_{sc}$, viz., the incident light is under-focussed or over-focussed with respect to the plane $P_D$. When the direction of movement as required of the projection lens 68 is thus determined, the automatic focus control central processing unit 160 produces at step E04 a control signal $S_{PL}$ effective to activate the lens drive unit 94 to drive the projection lens 68 for axial movement toward or away from the microfiche F in the microfiche holder assembly 52.

After the projection lens 68 is thus moved with respect to the microfiche F, the image contrasts $C_{sa}$, $C_{sb}$ and $C_{sc}$ in respect of the CCD arrays 148, 150 and 152, respectively, of the photodetector unit 82 are calculated for a second time as at step E05. The image contrasts $C_{sa}$, $C_{sb}$ and $C_{sc}$ thus newly determined are compared with one another at a subsequent step E06 to determine if the image contrast $C_{sa}$ in respect of the first CCD array 148 is larger or smaller than the image contrast $C_{sc}$ in respect of the third CCD array 152, and if the image contrast $C_{sb}$ in respect of the second CCD array 150 is larger than the image contrast $C_{sa}$ in respect of the first CCD array 148. When the image contrast $C_{sa}$ is found to be neither larger or nor smaller than the image contrast $C_{sc}$ and the image contrast $C_{sb}$ found to be larger than the image contrast $C_{sa}$, it is determined that the incident light is correctly focussed with respect to the plane $P_D$ so that the execution of the subroutine program A04 is terminated and the main routine program illustrated in FIGS. 13A and 13B is restored.

If it is found at step E06 that the image contrast $C_{sa}$ is larger or smaller than the image contrast $C_{sc}$, it is determined that the incident light is under-focussed or over-focussed with respect to the plane $P_D$. In this instance, the step E06 is followed by the step E03 and the loop of the steps E03 to E06 is repeated until it is found at the step E06 that the image contrast $C_{sa}$ is neither larger or nor smaller than the image contrast $C_{sc}$ and the image contrast $C_{sb}$ is larger than the image contrast $C_{sa}$.

If it is found at step E02 that the image contrast $C_{sa}$ calculated in respect of the first CCD array 148 is neither larger nor smaller than the image contrast $C_{sc}$ calculated in respect of the third CCD array 152 and that the image contrast $C_{sb}$ calculated in respect of the second CCD array 150 is not larger than the image contrast $C_{sa}$ calculated in respect of the first CCD array 148, the image contrasts $C_{sa}$, $C_{sc}$ and $C_{sc}$ in respect of the first, second and third CCD arrays 148, 150 and 152 must be equal to one another. It is, in this instance, determined that the incident light is focussed on a plane extremely far from the plane $P_D$ on which the image $F_D$ should be focussed by the projection lens 68. The step E02 is thus followed by step E07 at which the automatic focus control central processing unit 160 produces a control signal $S_{PL}$ effective to activate the lens drive unit 94 to drive the projection lens 68 for axial movement toward the microfiche F in the microfiche holder assembly 52 over a predetermined distance.

After the projection lens 68 is thus moved toward the microfiche F, the image contrasts $C_{sa}$, $C_{sb}$ and $C_{sc}$ in respect of the CCD arrays 148, 150 and 152, respectively, of the photodetector unit 82 are calculated for a second time as at step E08. The newly determined image contrasts $C_{sa}$, $C_{sb}$ and $C_{sc}$ are compared with one another at a subsequent step E09 to determine if the image contrast $C_{sa}$ in respect of the first CCD array 148 is larger or smaller than the image contrast $C_{sc}$ in respect of the third CCD array 152. When the image contrast $C_{sa}$ is found to be neither larger or nor smaller than the image contrast $C_{sc}$ and accordingly the image contrasts $C_{sa}$, $C_{sc}$ and $C_{sc}$ are still equal to one another, the step E09 is followed by the step E07 and the loop of the steps E07 to E09 is repeated until it is found at the step E09 that the image contrast $C_{sa}$ is larger or smaller than the image contrast $C_{sc}$. When the image contrast $C_{sa}$ is thus L—found to be larger or smaller than the image contrast $C_{sc}$, the step E09 is followed by the step E03 and the loop of the steps E03 to E06 may be repeated until it is found at the step E06 that the image contrast $C_{sa}$ is neither larger or nor smaller than the image contrast $C_{sc}$ and the image contrast $C_{sb}$ is larger than the image contrast $C_{sa}$.

MARGIN ERASURE SUBROUTINE PROGRAM (A06)

Subsequently to the focus control subroutine program A05 may be executed the margin erase subroutine program A06 to move the marginal mask member 70 with respect to the path of light from the projection lens 68 depending on the boundary between the image and non-image responsive zones of the imaginary display area 138.

Figure 21:
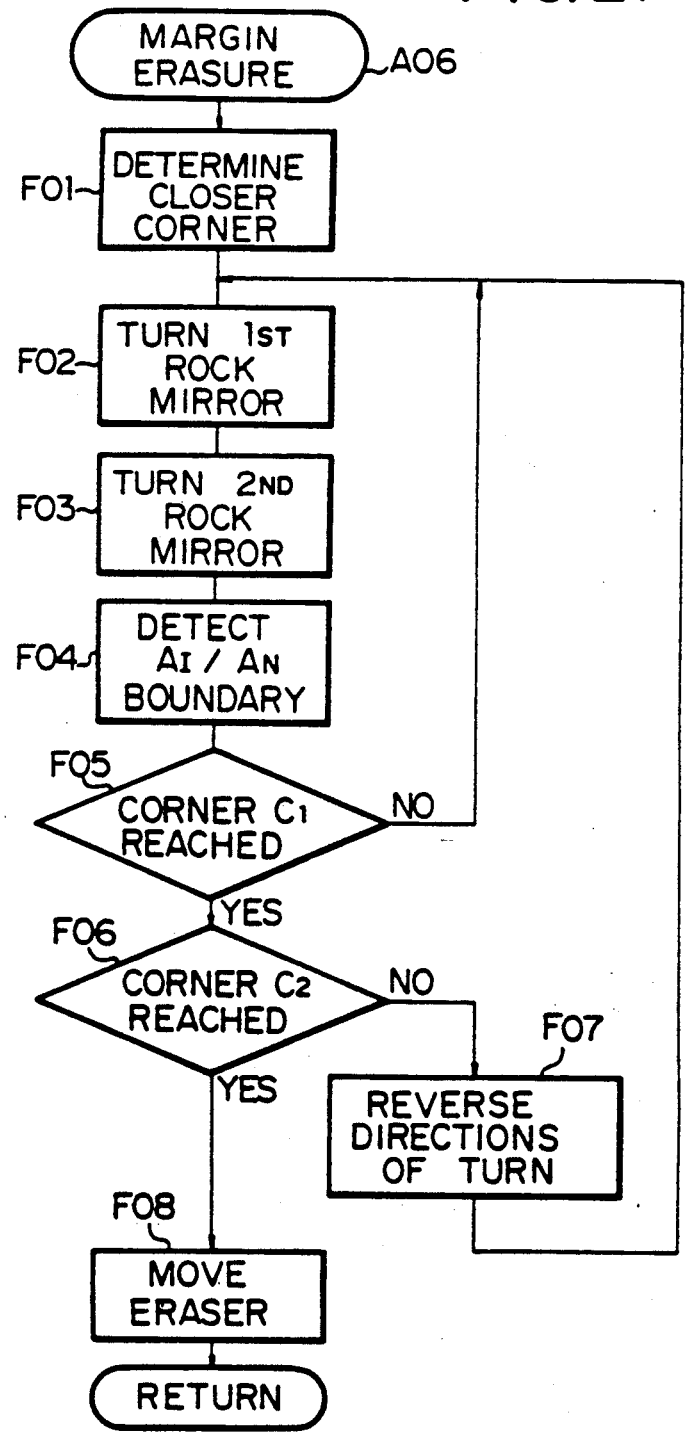
FIG. 21 is a flowchart showing the details of a margin erasure subroutine program included in the main routine program illustrated in FIGS. 13A and 13B.

Referring to FIG. 21, the margin erase subroutine program A06 starts with a step F01 at which it is determined whether the light sensitive area 140 of the photodetector unit 82 is currently located closer to one of the diagonally opposite corners of the imaginary display area 138 or to the other. The step F01 is followed by steps F02 and F03 at which the central processing unit 160 outputs the control signals $T_{M1}$ and $T_{M2}$ to the mirror drive units 96 and 98 so that the first and second reflector mirrors 72 and 76 are driven to turn in directions to move the light sensitive area 140 diagonally of the imaginary display area 138 toward that corner of the area 138 which has been determined to be closer to the light sensitive area 140. If it is determined at step F01 that the light sensitive area 140 of the photodetector unit 82 is currently located at equal distances from the diagonally opposite right upper and left lower corners of the imaginary display area 138, the reflector mirrors 72 and 76 are driven to turn in directions to move the light sensitive area 140 to a predetermined one of the corners of the area 138.

Figure 22:
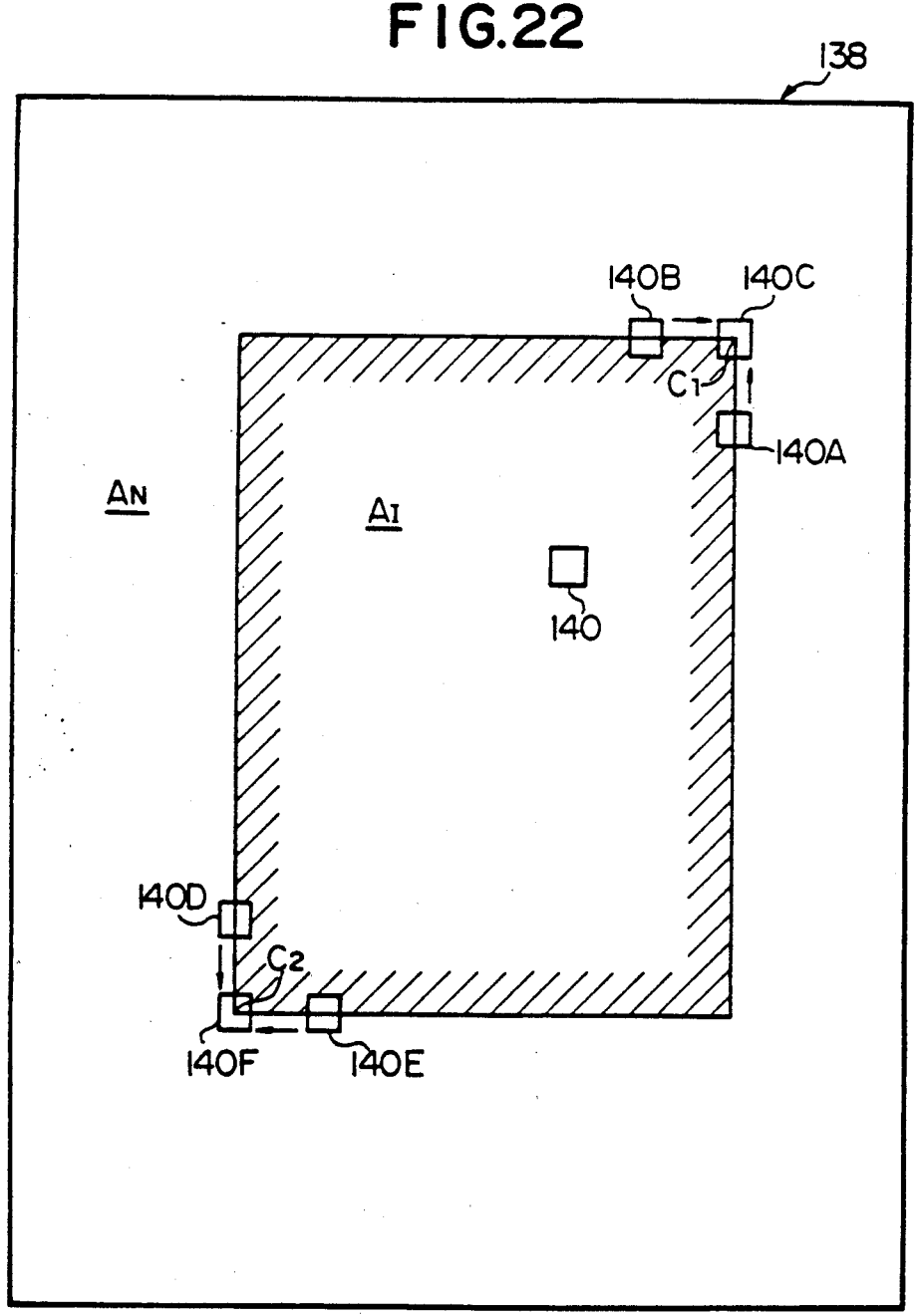
FIG. 22 is a plan view showing the imaginary display area on or with respect to which the light sensitive area of the photodetector unit is to be moved along various boundary portions between the image and non-image zones of the imaginary display area during execution of the margin erasure subroutine program illustrated in FIG. 21.

The subroutine program A02 then proceeds to step C04 at which the automatic focus control central processing unit 160 detects a boundary between image responsive and non-image responsive zones $R_I$ and $R_N$ of the light sensitive area 140 of the photodetector unit 82 from the distribution of the light intensities represented by the signals $S_F$ supplied from the charge-coupled devices of the second CCD array 150. Assuming that the microfiche F currently loaded in the microfiche holder assembly 52 is of the negative type, the imaginary display area 138 may have image and non-image zones $A_I$ and $A_N$ as indicated in FIG. 22. In this instance, the boundary thus detected between the image responsive and non-image responsive zones $R_I$ and $R_N$ of the light sensitive area 140 may be such that is indicated in FIGS. 23A, 23B, 23D or 23E when the light sensitive area 140 is located with respect to the imaginary display area 138 as indicated at 140A, 140B, 140D or 140E, respectively, in FIG. 22.

The step F04 is followed by a step F05 at which is queried whether or not the right upper corner $C_1$ of the image zone $A_I$ within the imaginary display area 138 is reached by the light sensitive area 140 of the photodetector unit 82. If the answer for this decision step F05 is given in the negative, the loop of the steps F02 to F05 is repeated to stepwise move the light sensitive area 140 until the answer for the step F05 turns affirmative. When the answer for the step F05 is thus given in the affirmative with the right upper corner $C_1$ of the image zone $A_I$ of the imaginary display area 138 reached by the light sensitive area 140, the boundary detected between the image responsive and non-image responsive zones $A_I$ and $A_N$ of the light sensitive area 140 will be such that is indicated in FIG. 22C with the light sensitive area 140 located as indicated at 140C in FIG. 23. When the answer for the step F05 is thus given in the affirmative, the automatic focus control central processing unit 160 detects the current angular positions of the first and second rockable reflector mirrors 72 and 76 from the signals $S_{M1}$ and $S_{M2}$ from the mirror position detectors 106 and 108, respectively. Such angular positions are stored into the memory 164 as indicating the location of the right upper corner $C_1$ of the image zone $A_I$ of the imaginary display area 138.

Figure 23A:
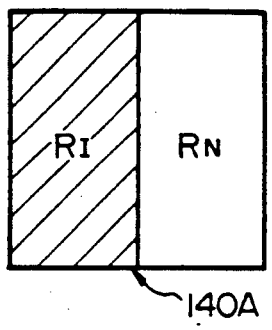
FIGS. 23A to 23F are plan views showing examples of the boundary between image responsive and non-image responsive zones of the light sensitive area as detected responsive to the image and non-image zones of the imaginary display area illustrated in FIG. 22.
Figure 23B:
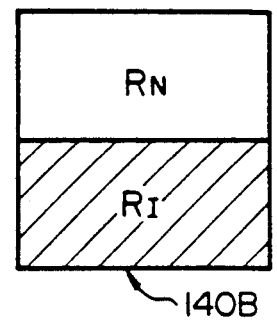
Figure 23C:
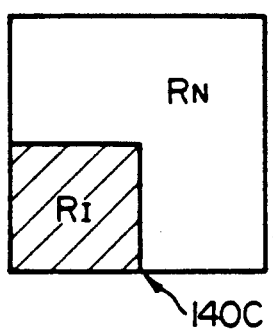
Figure 23D:
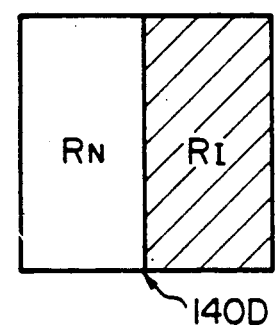
Figure 23E:
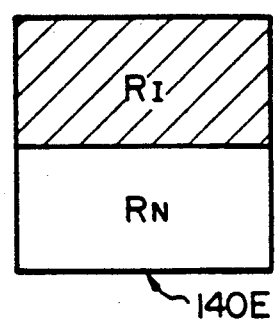
Figure 23F:
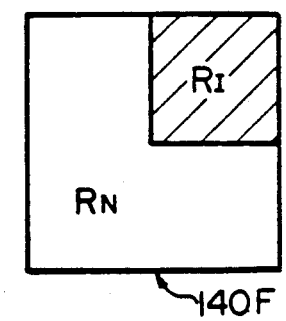

Subsequently to step F06 at which is questioned whether or not the diagonally opposite, viz., left lower corner $C_2$ of the image zone $A_I$ within the imaginary display area 138 is reached by the ligyht sensitive area 140 of the photodetector unit 82. IF the answer for this decision step F06 is given in the negative, the step F06 is followed by a step F07 at which the automatic focus control central processing unit 160 issues a control signal requiring the mirror drive units 96 and 98 to reverse the directions in which the first and second rockable reflector mirrors 72 and 74 are to be driven to turn. The loop of the steps F02 to F07 is then repeated to stepwise move the light sensitive area 140 in the reverse direction, viz., toward the left lower corner $C_2$ of the image zone $A_I$ within the imaginary display area 138 until the answer for the step F06 turns affirmative. When the answer for the step F06 is thus given in the affirmative with the left lower corner $C_2$ of the image zone $A_I$ of the imaginary display area 138 reached by the light sensitive area 140, the boundary detected between the image responsive and non-image responsive zones $A_I$ and $A_N$ of the light sensitive area 140 will be such that is indicated in FIG. 23F with the light sensitive area 140 located as indicated at 140F in FIG. 22. When the answer for the step F06 is thus given in the affirmative, the step F06 is followed by a step F08 at which the automatic focus control central processing unit 160 outputs the control signal $T_{ME}$ to the eraser drive unit 102 so that the eraser drive unit 102 is activated to drive the marginal mask member 70 to horizontally move forwardly or rearwardly, or leftwardly or rightwardly with respect to the path of light from the projection lens 68.

Figure 24:
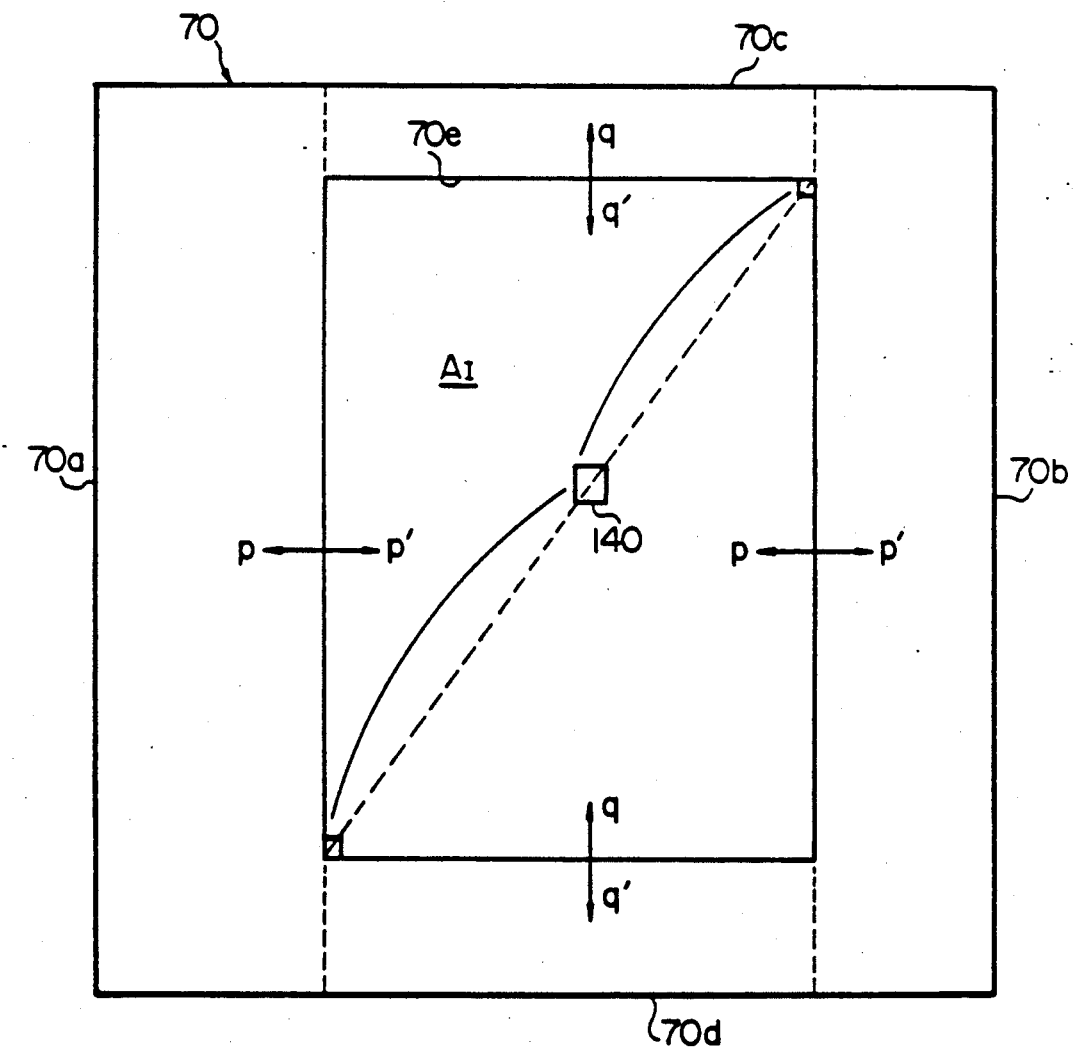
FIG. 24 is a plan view showing the arrangement of a marginal mask member forming part of the apparatus illustrated in FIG. 1 and shown positioned with respect to the image responsive zone of the imaginary display area.

As illustrated in FIG. 24, the marginal mask member 70 comprises a pair of spaced parallel side portions 70a and 70b and a pair of spaced parallel cross portions 70c and 70d interconnecting the side portions 70a and 70b together, thus forming a rectangular opening 70e defined by the portions 70a to 70d. Such a mask member 70 is horizontally movable leftwardly or rightwardly as indicated by arrows p and p', or forwardly or rearwardly as indicated by arrows q and q' with respect to an extension of the optical axis of the projection lens 68. At step A08, the eraser drive unit 102 is activated to drive the marginal mask member 70 to horizontally move in the direction of arrow p or p' and/or in the direction of arrow q or q' with respect to the path of light from the projection lens 68 so that the image responsive zone $A_I$ of the imaginary display area 138 is correctly located within the opening 70e of the marginal mask member 70 as shown. Upon termination of the step A08, the margin erase subroutine program A06 is followed by the negative/positive discriminate subroutine program A07 of the main routine program.

While the marginal mask member 70 is herein arranged to be operable commonly for both of the read and print systems, separate marginal mask members may be provided respectively in conjunction with the read and print systems. As an alternative, such a mask member or members may be substituted by or used in combination with a charge eraser lamp positioned in the vicinity of the photosensitive drum 90. The construction and arrangement of such a charge eraser lamp being well known in the art of printers and image duplicating machines, description thereof will not herein incorporated. NEGATIVE/POSITIVE DISCRIMINATE SUBROUTINE PROGRAM (A07)

Upon termination of the margin erase subroutine program A06, the main routine program may proceeds to the negative/positive discriminate subroutine program A07 to discriminate the microfiche F in the microfiche holder 52 between the negative and positive.

Figure 25:
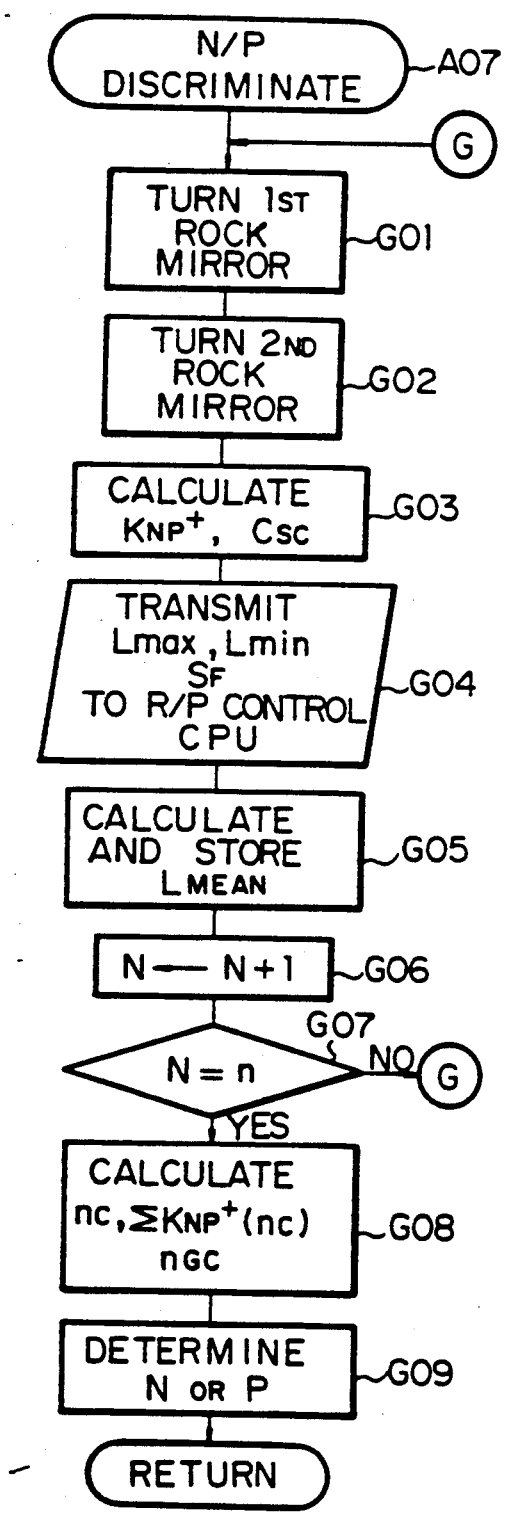
FIG. 25 is a flowchart showing the details of a negative/positive discriminate subroutine program included in the main routine program illustrated in FIGS. 13A and 13B.

Referring to FIG. 25, such a negative/positive discriminate subroutine program A07 starts with steps G01 and G02 at which the mirror drive units 96 and 98 receive the control signals $S_{M1}$ and $S_{M2}$ from the automatic focus control central processing unit 160 and are thus activated to drive the first and second rockable reflector mirrors 72 and 76 to turn about the axes H and I, respectively, of turn thereof. In this instance, the reflector mirrors 72 and 76 are driven to turn so that the light sensitive area 140 of the photodetector unit 82 is moved from one of the diagonally opposite corners of the area 138 to the other. While the light sensitive area 140 is being thus moved from one of the corners of the area 138 to the other, the automatic focus control central processing unit 160 executes step G03 to detect from the second CCD array 150 the signals $S_F$ produced successively by the charge-coupled devices located along the path of movement of the light sensitive area 140. The automatic focus control central processing unit 160 further reads from the memory 162 an intensity of light $L_{NP}$ predetermined for the discrimination between the negative and positive of microfiches and compares with this predetermined light intensity $L_{NP}$ each of the intensities of light represented by the signal $S_F$ from the second CCD array 150 of the photodetector unit 82. Thus, the central processing unit 160 outputs a signal indicative of the number $K_{NP+}$ of the signals $S_F$ representative of the intensities of light higher than the predetermined light intensity $L_{NP}$ and a signal indicative of the image contrast or differential light intensity $C_{sb}$ which is given by the difference between the maximum and minimum intensities $L_{max}$ and $L_{min}$ of the light incident on the second CCD array 150. The signals thus indicative of the number $K_{NP+}$ and the differential light intensity $C_{sb}$ and signals indicative of the maximum and minimum light intensities $L_{max}$ and $L_{min}$ as well as the signals $S_F$ from the CCD array 150 are fed from the automatic focus control central processing unit 160 to the read/print control central processing unit 168 as at step G04. The read/print control central processing unit 168 then calculates at step G05 the mean value $L_{MEAN}$ of the intensities of light represented by the signals $S_F$ and stores the mean value $L_{MEAN}$ and the maximum and minimum light intensities $L_{max}$ and $L_{min}$ into the associated memory 172. The steps G01 to G05 are executed for each of the step of the light sensitive area 140 of the photodetector unit 82 which is stepwise a total of an n number of times moved from one of the diagonally opposite corner to the other of the imaginary display area 138.

When it is confirmed through steps G06 and G07 that the light sensitive area 140 of the photodetector unit 82 has been stepwise moved the n number of times from one of the diagonally opposite corner to the other of the imaginary display area 138, the automatic focus control central processing unit 160 reads from the memory 162 the predetermined lower limit value $C_{min}$ (used at step D05 of the subroutine program A04) of the differential light intensities. At subsequent step G08, the automatic focus control central processing unit 160 then compares the n number of differential light intensity $C_{sb}$ with this limit value $C_{min}$ and determines the number $n_C$ of times the former is found to be larger than the latter and the total value of the numbers $K_{NP+}$ which have been calculated each as being indicative of the signals $S_F$ representative of the intensities of light higher than the predetermined light intensity $L_{NP}$. Thereafter, the automatic focus control central processing unit 160 calculates a value $n_{GC}$ in accordance with the following equation:

$$n_{GC} = n_G * n_C/2 \qquad \text{Eq. 3}$$

where $n_G$ stands for the total number of the charge-coupled devices which form the second CCD array 150. The value thus obtained is representative a number which is one half of the total number of the signals produced by the charge-coupled devices which have responded to any degrees of contrast and are thus useful for discriminating a microfiche between the negative or positive. Thus, the step G08 is followed by a step G09 at which the automatic focus control central processing unit 160 compares the value $n_{GC}$ with the total value of the numbers $K_{NP+}$ and determines that the microfiche currently in use is of the positive type if the former is less than the latter and that the microfiche is of the negative type if the former is larger than the latter.

Figure 26:
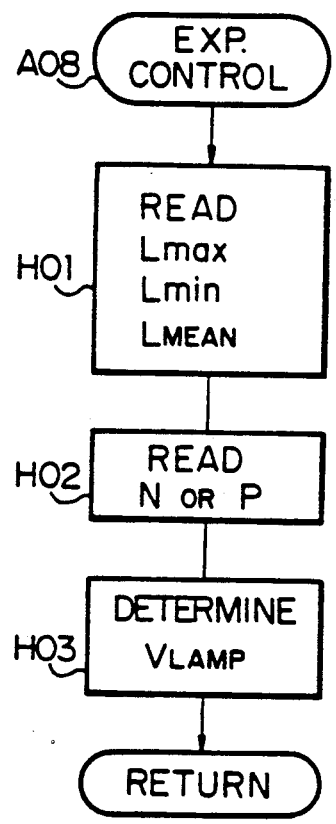
FIG. 26 is a flowchart showing the details of an exposure control subroutine program included in the main routine program illustrated in FIGS. 13A and 13B.

Upon termination of the step G09, the main routine program proceeds to the exposure control subroutine program A08 shown in FIG. 26. EXPOSURE CONTROL SUBROUTINE PROGRAM (A08)

Referring to FIG. 26, the exposure control subroutine program A08 starts with a step H-1 at which the read/print control central processing unit 168 reads from the memory 172 the values indicative of the intensities of light detected by the second CCD array 150 of the photodetector unit 82, the maximum and minimum light intensities $L_{max}$ and $L_{min}$, and the mean light intensity $L_{MEAN}$ which have been stored into the memory 172 during execution of the negative/positive discriminate subroutine program A07 as hereinbefore described. The step H01 is followed by step H02 at which the result of the decision at step G09 of the negative/positive discriminate subroutine program A07 is entered into the read/print control central processing unit 168, which then determines the optimum voltage $V_{LAMP}$ with which the illumination lamp 58 which forms part of the previously mentioned light source assembly 56 is to be energized.

Subsequently to the step H03, the main routine program proceeds to the first/third-path-of-light select subroutine program A09 shown in FIG. 27.

FIRST/THIRD-PATH-OF-LIGHT SELECT SUBROUTINE PROGRAM (A09)

Figure 27:
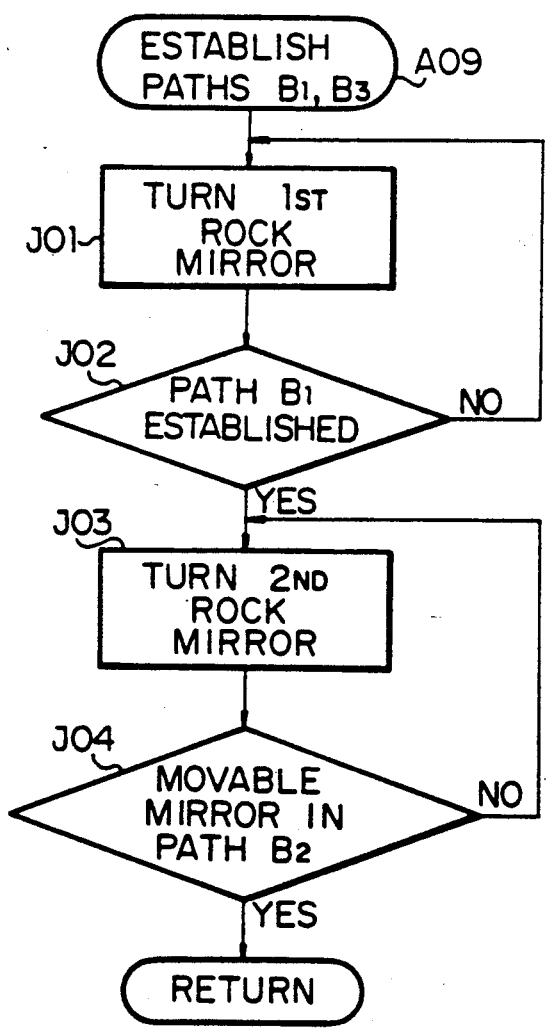
FIG. 27 is a flowchart showing the details of a first-/third-path-of-light select subroutine program included in the main routine program illustrated in FIGS. 13A and 13B.

Referring to FIG. 27, the first/third-path-of-light select subroutine program A09 starts with step J01 at which the automatic focus control central processing unit 160 outputs the control signal $S_{M1}$ to activate the mirror drive unit 96 to drive the first rockable reflector mirror 72 to turn from the second angular position to the first angular position thereof. The reflector mirror 72 thus moved to the first angular position directs the beam of light B from the projection lens 68 to the image projecting reflector mirror 74 along the first path of light $B_1$. The image resulting from the original image read from the image frame of the microfiche F currently located in the microfiche holder assembly 52 is thus reproduced on the image viewing screen 38 which has the inner face coincident with the plane on which the image is to be focussed by the projection lens 68.

The step J01 is followed by a decision step J02 at which is confirmed whether or not the first path of light $B_1$ is established. This decision is made on the basis of the signal $S_{M1}$ supplied from the mirror position detector 106 associated with the first rockable reflector mirror 72. If the answer for this decision step J02 is given in the negative, the loop of the steps J01 and J02 is repeated until the answer for the step J02 turns affirmative.

When the answer for the step J02 is thus given in the affirmative, the step J02 is followed by a step J03 at which the automatic focus control central process unit 160 outputs the control signal $S_{M3}$ to activate the mirror drive unit 100 to drive the movable reflector mirror 84 to move from the position withdrawn from the second path of light $B_2$ into the position intercepting the beam of light along the path $B_2$. The reflector mirror 84 thus moved into the second path of light $B_2$ directs the beam of light from the projection lens 68 to the photosensitive drum 90 along the third path of light $B_3$ and enables the apparatus to perform printing operation as desired for the original image read from the image frame of the microfiche F currently located in the microfiche holder assembly 52.

The step J03 is followed by a decision step J04 at which is confirmed whether or not the third path of light $B_2$ is established. This decision is made on the basis of the signal $S_{M3}$ supplied from the mirror position detector 110 associated with the movable reflector mirror 84. If the answer for this decision step J04 is given in the negative, the loop of the steps J03 and J04 is repeated until the answer for the step J04 turns affirmative. When the answer for the step J04 is thus given in the affirmative, the step J04 is followed the steps subsequent to the subroutine program A09 in the main routine program.

What is claimed is:

1. In an optical apparatus wherein an image is to be focused onto a projection surface through a projection lens and wherein a focal state at a particular location of the projection surface is to be detected to move the projection lens on the basis of the result of detection of said focal state, a method of automatically controlling the focal point of said projection lens, comprising the steps of:

determining whether the focal state at said particular location of the projection surface can or cannot be detected, and when it is found that said focal state at said particular location of the projection surface cannot be detected, detecting a focal state at another location of the projection surface to move the projection lens with respect to the projection surface on the basis of the result of the detection at the other location.

2. A method as set forth in claim 1, in which said particular location is selected within an area extending from one end of said projection surface to another.

3. A method as set forth in claim 1, in which said projection surface is rectangularly shaped and said particular location is selected within an area extending from one parallel end of said rectangular projection surface to the other.

4. A method as set forth in claim 1, in which said projection surface is rectangularly shaped and said particular location is selected within an area extending from one diagonally opposite corner of said rectangular projection surface to the other.

5. An automatic focus control system for an optical apparatus wherein an image is to be focused onto a projection surface through a projection lens and wherein the projection lens is to be moved with respect to the projection surface on the basis of signals output from focus detect means located externally of said projection surface, said automatic focus control system comprising:

determination means for determining whether said signals satisfy a predetermined condition;

beam deflecting means for projecting onto said focus detect means an image corresponding to an image to be projected onto a particular region of said projection surface, and control means for controlling said beam deflecting means so that, when it is found that said signals fail to satisfy said predetermined condition, said beam deflecting means projects onto said focus detect means an image corresponding to an image to be projected onto a second region of said projection surface.

6. An automatic focus control system as set forth in claim 5, in which said projection surface is rectangularly shaped and said particular region is selected within an area extending from one of diagonally opposite corners of said rectangular projection surface to the other.

7. An automatic focus control system as set forth in claim 6, in which said projection surface is rectangularly shaped and said second region is selected within said area extending from one diagonally opposite corner of said rectangular projection surface to the other.

8. An optical apparatus comprising:

a detachable projection lens for projecting an image onto a target plane;

automatic focus control means for controlling the focal point of said projection lens;

detecting means for detecting incorporation of said projection lens into the apparatus; and means for enabling said automatic focus control means to operate when the incorporation of said projection lens into the apparatus is detected by said detecting means.

9. An optical apparatus as set forth in claim 8, in which said apparatus further includes a movable member to be moved within the apparatus when said projection lens is to be incorporated into or detached from the apparatus, said detecting means being responsive to movement of said movable member for detecting incorporation of said projection lens into the apparatus when the movable member is caused to move within the apparatus.

10. An optical apparatus as set forth in claim 8, wherein said projection lens projects images of microfilms.

11. In an optical apparatus including a detachable projection lens for projecting an image onto a target plane, a method of operating the apparatus comprising the steps of:
- detecting the incorporation of said detachable projection lens into the apparatus; and
- automatically changing the focal point of the detachable projection lens through operation of an automatic focus control means upon detection of the incorporation of said detachable projection lens into the apparatus.

12. In an image projecting apparatus including a main housing, a target plane provided at the main housing, original holding means provided at the main housing for holding originals, and a projection lens detachably provided at the main housing for projecting images of the originals onto the target plane, a method of operating the apparatus comprising the steps of:
- detecting the incorporation of said detachable projection lens into the apparatus; and
- enabling operation of an automatic focus control means upon detection of the incorporation of said projection lens into the apparatus for automatically changing the focal point of the projection lens.

* * * * *